United States Patent
Kojima et al.

(10) Patent No.: US 8,122,169 B2
(45) Date of Patent: Feb. 21, 2012

(54) DATA BUFFERING BASED ON PRIORITY TAGGING OF INPUT DATA

(75) Inventors: Ryuji Kojima, Yokohama (JP);
 Tadahito Miura, Yokohama (JP);
 Yoshikazu Tsuzuki, Yokohama (JP);
 Shinichirou Nakajima, Yokohama (JP);
 Daishi Kawabata, Yokohama (JP);
 Hiroki Abukawa, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 31 days.

(21) Appl. No.: 12/768,473

(22) Filed: Apr. 27, 2010

(65) Prior Publication Data

US 2010/0281193 A1 Nov. 4, 2010

(30) Foreign Application Priority Data

May 1, 2009 (JP) .................................. 2009-111987

(51) Int. Cl.
 *G06F 3/00* (2006.01)
(52) U.S. Cl. .................. 710/52; 710/14; 710/33; 710/40
(58) Field of Classification Search .................. None
 See application file for complete search history.

(56) References Cited

U.S. PATENT DOCUMENTS

| 2003/0185297 A1 | 10/2003 | Greenfield et al. |
| 2003/0235193 A1 | 12/2003 | Hosaka |
| 2004/0264284 A1* | 12/2004 | Priborsky et al. ............. 365/232 |

FOREIGN PATENT DOCUMENTS

| JP | 2003-264581 A | 9/2003 |
| JP | 2004-7530 A | 1/2004 |

* cited by examiner

*Primary Examiner* — Alan Chen
(74) *Attorney, Agent, or Firm* — Arent Fox LLP

(57) ABSTRACT

A data buffer device includes: a tag value generation circuit that generates a tag value; a first buffer that stores first priority data; a second buffer that stores second priority data; and a data output circuit that outputs the first priority data or the second priority data, wherein the tag value generation circuit sets a tag value for the following second input data to a second tag value which differs from a first tag value for second preceding input data, and sets a tag value of the following first input data to a fourth tag value that is the same as a third tag value for the first preceding input data, and wherein the data output circuit outputs the first priority data or the second priority data in a first mode based on the tag values and outputs the first priority data earlier in a second mode.

13 Claims, 25 Drawing Sheets

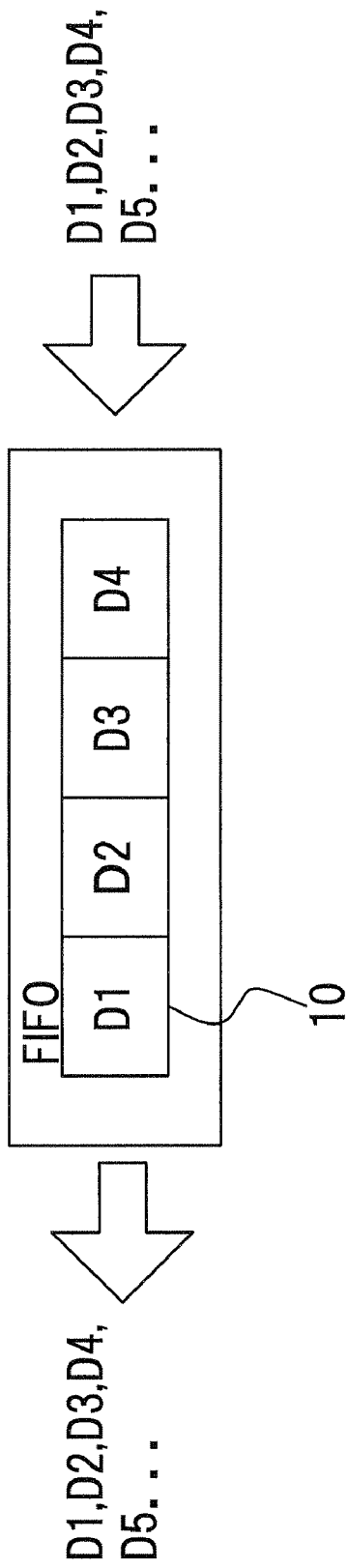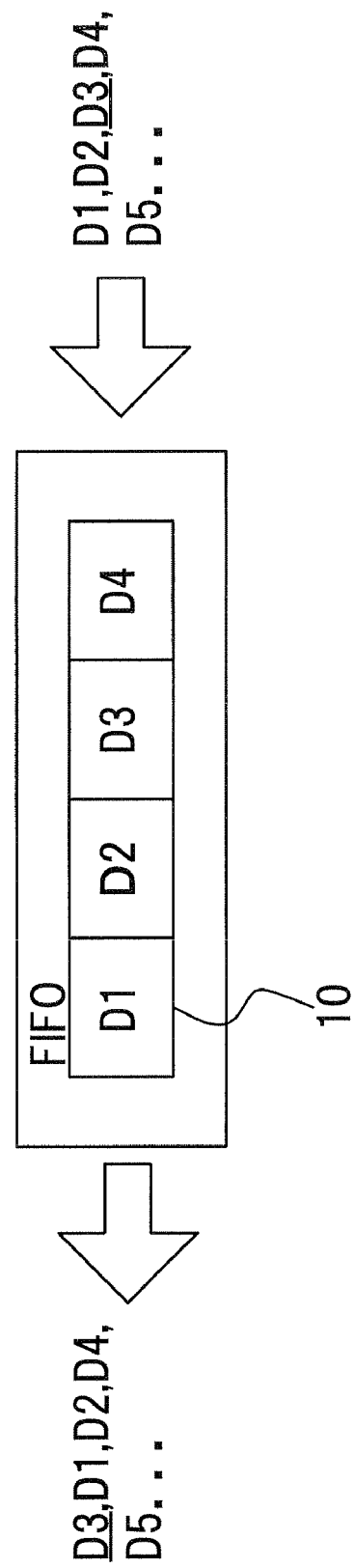

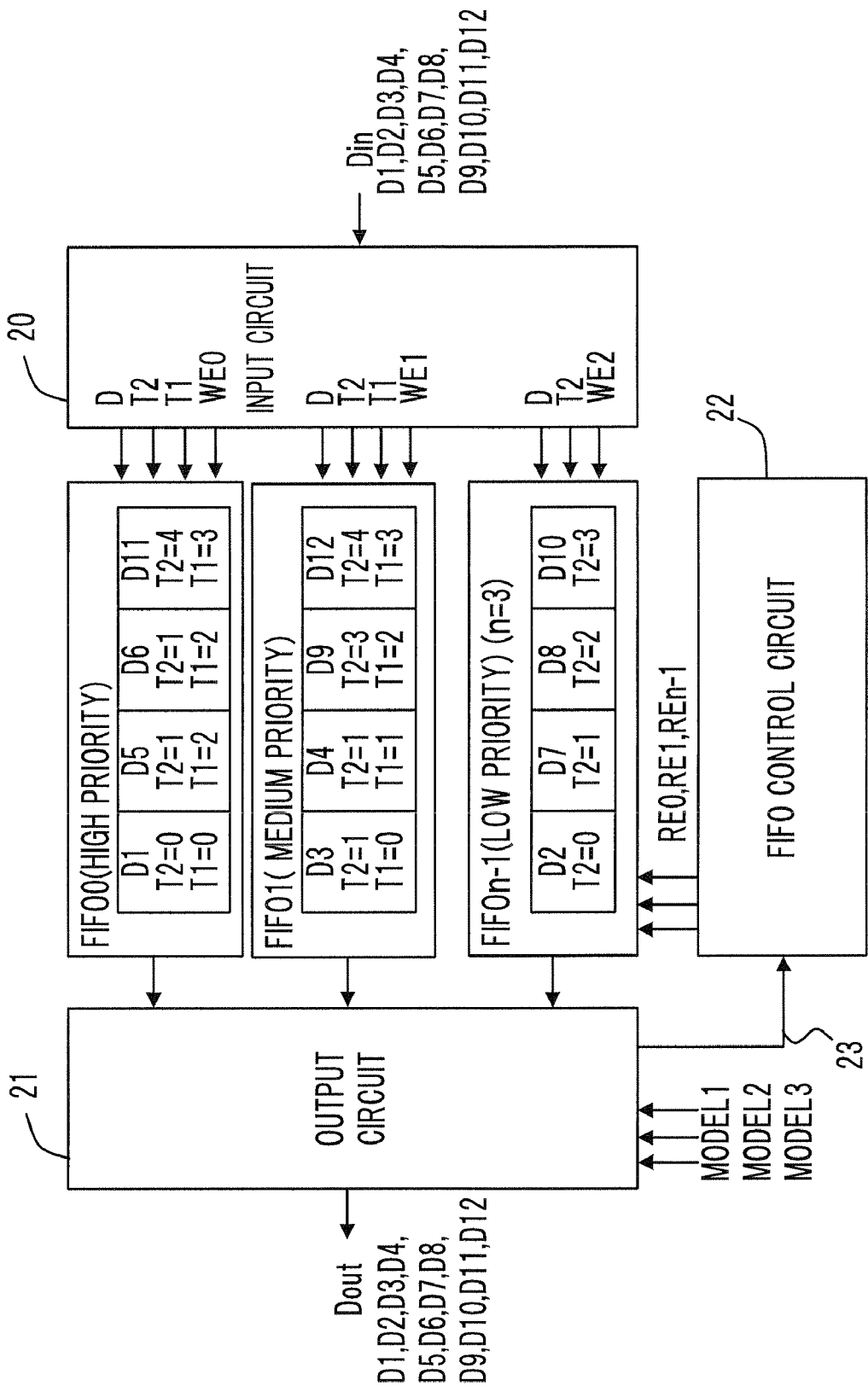

FIG. 19

| CREDIT | | | MODE | | |
|---|---|---|---|---|---|
| Posted | Completion | Non Posted | MODE0 | MODE1 | MODE2 |
| ○ | ○ | ○ | 0 | 0 | 0 |
| ○ | ○ | × | 0 | 0 | 1 |
| ○ | × | ○ | 0 | 1 | 0 |
| ○ | × | × | 0 | 1 | 1 |
| × | ○ | ○ | 1 | 0 | 0 |
| × | ○ | × | 1 | 0 | 1 |
| × | × | ○ | 1 | 1 | 0 |
| × | × | × | 1 | 1 | 1 |

\* ○ : PRESENCE OF CREDIT
  × : ABSENCE OF CREDIT

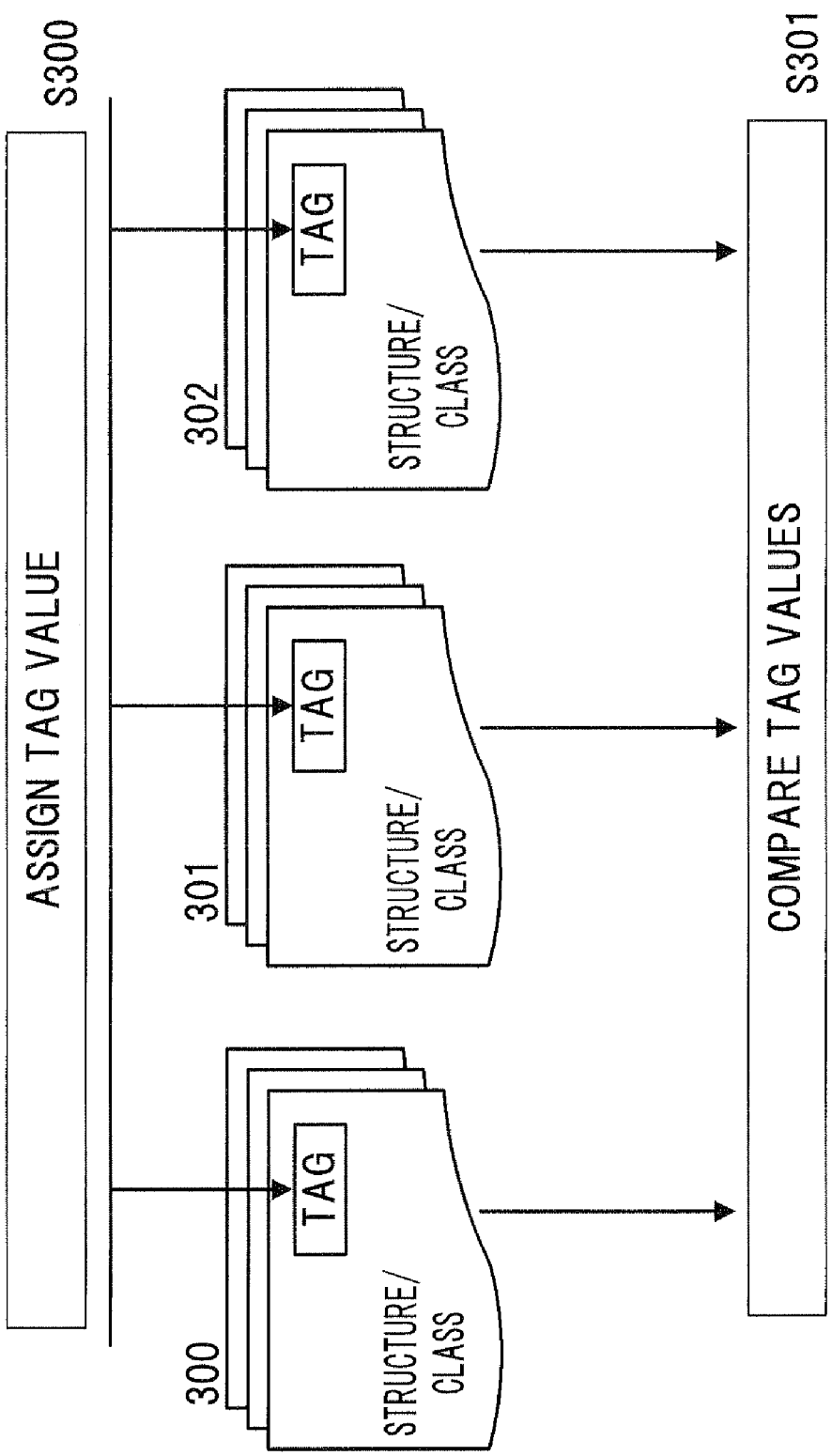

DATA BUFFERING BASED ON PRIORITY TAGGING OF INPUT DATA

CROSS-REFERENCE TO RELATED APPLICATIONS

This application claims the benefit of priority from Japanese Patent Application No. 2009-111987 filed on May 1, 2009, the entire contents of which are incorporated herein by reference.

BACKGROUND

1. Field

Aspects discussed herein relate to a data buffer device.

2. Description of Related Art

A communication apparatus and a computer system apparatus include a data buffer device. The data buffer device stores received data and outputs the stored data. The data buffer device includes a FIFO (First-in First-out) buffer for temporarily storing input data and outputting the data in an order in which the data is input.

The related art is disclosed in Japanese Laid-open Patent Publication No. 2003-264581 or Japanese Laid-open Patent Publication No. 2004-7530.

SUMMARY

According to one aspect of the embodiments, a data buffer device that stores input data and outputs the stored data in a given sequence is provided. The data buffer device may include a tag value generation circuit that generates a tag value for the input data; a first buffer that stores first priority data having a first priority in a first sequence, with which the first priority data is input, together with the tag values; a second buffer that stores second priority data having a second priority in a second sequence, with which the second priority data is input, together with the tag values; and a data output circuit that outputs one of the first priority data and the second priority data which are positioned at respective heads of the first buffer and the second buffer, wherein the tag value generation circuit sets, in response to input of second preceding input data having the second priority, a tag value for the following second input data to a second tag value which differs from a first tag value for the second preceding input data, and sets, in response to input of first preceding input data having the first priority, a tag value for first next input data to a fourth tag value that is substantially the same as a third tag value for the first preceding input data, and wherein the data output circuit outputs one of the first priority data and the second priority data, which is input earlier, in a first mode based on the tag values of the first priority data and the second priority data, and outputs the first priority data earlier than the second priority data in a second mode.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

FIGS. 1A and 1B illustrate an exemplary FIFO buffer;
FIG. 2 illustrates an exemplary data buffer device;
FIG. 19 illustrates an exemplary correspondence between a credit signal and a mode signal;
FIG. 25 illustrates exemplary structures/classes.

DESCRIPTION OF EMBODIMENTS

Figure 3:
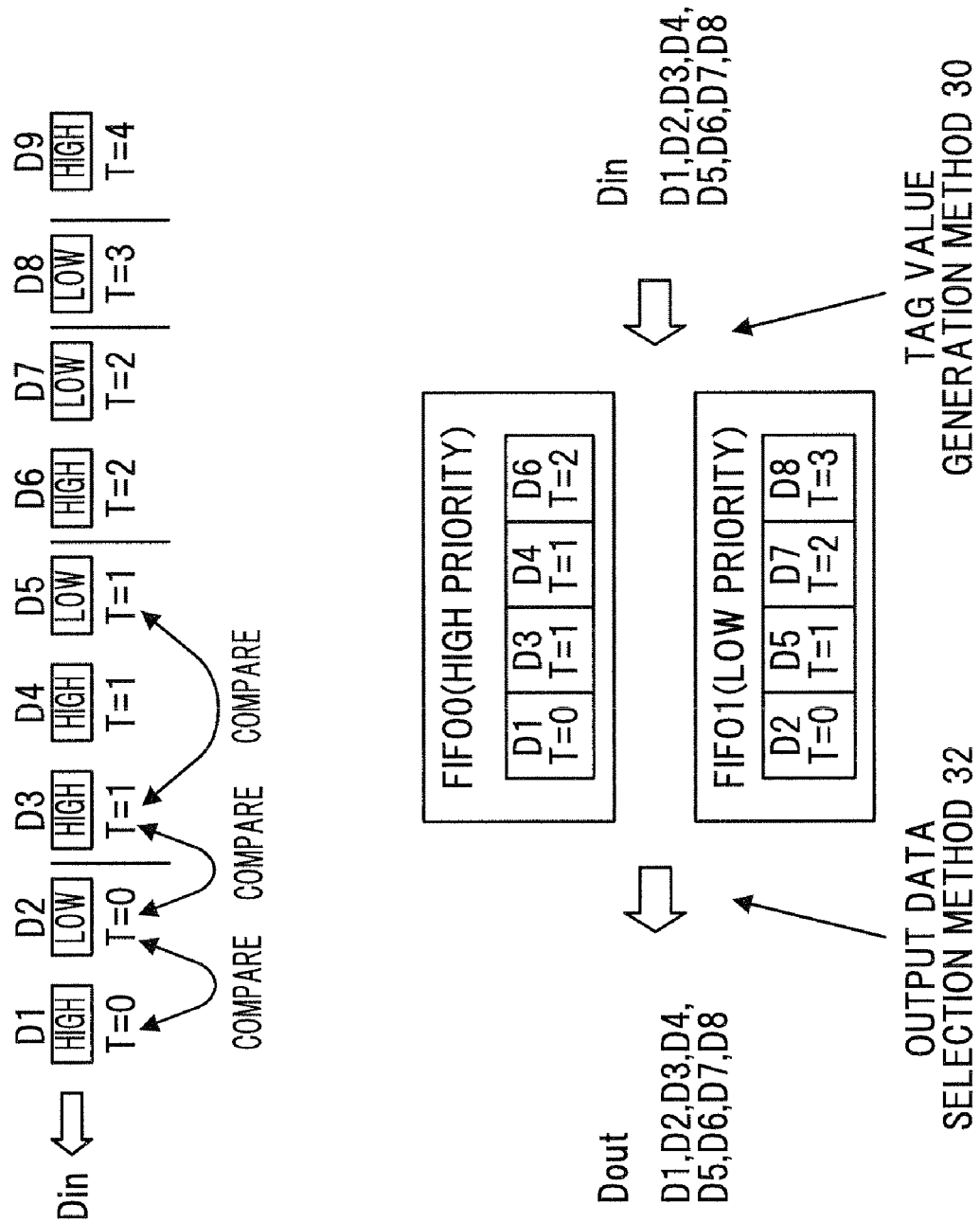
FIG. 3 illustrates an exemplary operation of a data buffer device.

FIGS. 1A and 1B illustrate an exemplary FIFO buffer. The FIFO buffer illustrated in FIG. 1A receives data D1 to D5 in a packet format, temporarily stores the data D1 to D5 in a buffer memory 10 in an order in which the data is received, and outputs the stored data D1 to D5 in the order in which the data was received.

The FIFO buffer illustrated in FIG. 1B temporarily stores the data D1 to D5 in the buffer memory 10 in the order in which the data is received, but the FIFO buffer first outputs the data 3 having the highest priority and then outputs the data D1, D2, D4 and D5 each having a lower priority. The FIFO buffer illustrated in FIG. 1B stores information indicating that the priority of the data D3 is the highest, and includes a circuit for preferentially outputting the data D3.

When a plurality of FIFO buffers are provided corresponding to different priorities, the input order of data stored in the FIFO buffers is determined.

FIG. 2 illustrates an exemplary data buffer device. The data buffer device stores input data D1 to D12 in buffer units FIFO per priority. The data buffer device illustrated in FIG. 2 outputs the data according to the input order thereof, or outputs the data in a particular buffer unit regardless of the input order, or outputs the data in descending order of priority. One of those output modes is selected. An input circuit 20 distinguishes priorities included in, e.g., headers of the input data D1 to D12 and stores the data D1 to D12 in first to n-th buffer units FIFO0 to FIFOn−1, which corresponds to n types of priorities, in the order in which the individual data have been input. The order of priority descends from the first priority to the n-th priority.

FIG. 2 illustrates an exemplary data buffer device. The example of FIG. 2 represents a case of n=3. The first buffer unit FIFO0, the second buffer unit FIFO1, and the third buffer unit FIFO2 are provided in an order of high priority. The first buffer unit FIFO0 stores high-priority data having the highest priority. The second buffer unit FIFO1 stores medium-priority data having the second highest priority, and the third buffer unit FIFO2 stores low-priority data having the lowest priority. Each of the buffer units FIFO0 to FIFO2 may be a FIFO (First-in First-out) buffer for storing input data in the order in which the data is input, and outputting the stored data in the order in which the data has been input.

The input circuit 20 includes a tag value generation unit for generating a tag value per input data. The tag value generation unit generates a tag value T2 corresponding to a data input order between the buffer unit FIFO2 serving as a reference buffer and the other buffer units FIFO0 and FIFO1 having higher priorities, and stores the generated tag value T2 in one of the buffer units FIFO2, FIFO1 and FIFO0 together with the input data. For example, in response to inputting of the input data to the buffer unit FIFO2, the tag value generation unit changes a tag value T2 for the next input data. In response to inputting of the input data to the buffer units FIFO0 and FIFO1, the tag value generation unit may not change the tag value T2 for the next input data.

The tag value generation unit generates a tag value T1 corresponding to a data input order between the buffer unit FIFO1 serving as a reference buffer and the other buffer unit FIFO0 with higher priority, and stores the generated tag value T1 in one of the buffer units FIFO1 and FIFO0 together with the input data. For example, in response to inputting of the input data to the buffer unit FIFO1, the tag value generation unit changes a tag value T1 for the next input data. In response to inputting of the input data to the buffer units FIFO0, the tag value generation unit may not change the tag value T1 for the next input data.

The tag value generation unit generates a j-th tag value corresponding to a data input order between a j-th buffer unit (reference buffer) and first to (j−1)-th buffer units. For example, j is from 2 to n. In response to inputting of the preceding input data to the j-th buffer unit (reference buffer), the tag value generation unit changes the tag value for the next input data which is different from the tag value for the preceding input data. In response to inputting of the preceding input data to the first to (j−1)-th buffer units, which have higher priorities than the reference buffer, the tag value generation unit sets the tag value for the next input data which is the same as the tag value for the preceding input data.

The input circuit 20 distinguishes the priority from header information in each of the input data D1 to D12, e.g., data in the packet format, and generates the tag values T1 and T2. For example, when one of write-enable signals WE0, WE1 and WE2 is asserted, the input circuit 20 writes the input data D, the tag value T1, and/or the tag value T2 in a corresponding one of the buffer units FIFO0 to FIFO2.

Each buffer unit FIFO may include a control module for managing a write pointer and a read pointer, for example. The write pointer is incremented each time the input data is written into a tail buffer, and the read pointer is incremented each time the data is read and output from a head buffer.

In an ordinary output mode, an output circuit 21 determines the input order based on the tag values T1 and T2 of respective head data in the buffer units FIFO0, FIFO1 and FIFO2, and outputs the data that has been input at the earliest time. In a mode other than the ordinary output mode, the output circuit 21 outputs the data in the designated buffer unit in sequence regardless of the input order. In a passing (overtaking) output mode, the output circuit 21 outputs the data in the buffer unit with a higher priority than the data in the buffer unit from which the data outputting has been stopped. When there are a plurality of buffer units having higher priorities than the data in the buffer unit from which the data outputting has been stopped, the data in the plurality of buffer units is output in an order according to the tag values. The output circuit 21 outputs, to a FIFO control circuit 22, an output result signal 23 indicating in which one of the buffer units the output data has been stored. After returning to the ordinary output mode, the output circuit 21 determines an order in which the data is input based on the tag values T1 and T2 and outputs the data in the order. The input order is determined by comparing the tag values with each other.

The FIFO control circuit 22 asserts read-enable signals RE0, RE1 and RE2 for the respective buffer units FIFO, thus causing the data to be output from the corresponding buffer units. In accordance with the output result signal 23, the FIFO control circuit 22 controls update of the read pointer for the buffer unit from which the data has been output. The FIFO control circuit 22 may assert the write-enable signals WE0, WE1 and WE2 for the respective buffer units FIFO instead of the input circuit 20.

Mode signals MODE1, MODE2 and MODE3 are supplied to the output circuit 21. The output circuit 21 outputs the output data in the ordinary output mode, the mode other than the ordinary output mode, or the passing output mode based on the supplied mode signal.

In the ordinary output mode, the output circuit 21 outputs the data among the first to n-th data, which has been input at the earliest time, based on the tag values of the first to n-th data at the respective heads of the first to n-th buffer units. In the mode other than the ordinary output mode, the output circuit 21 outputs the data in the designated buffer unit in sequence. In the passing output mode, the output circuit 21 outputs the data, which is input later and has a higher priority.

Figure 4:
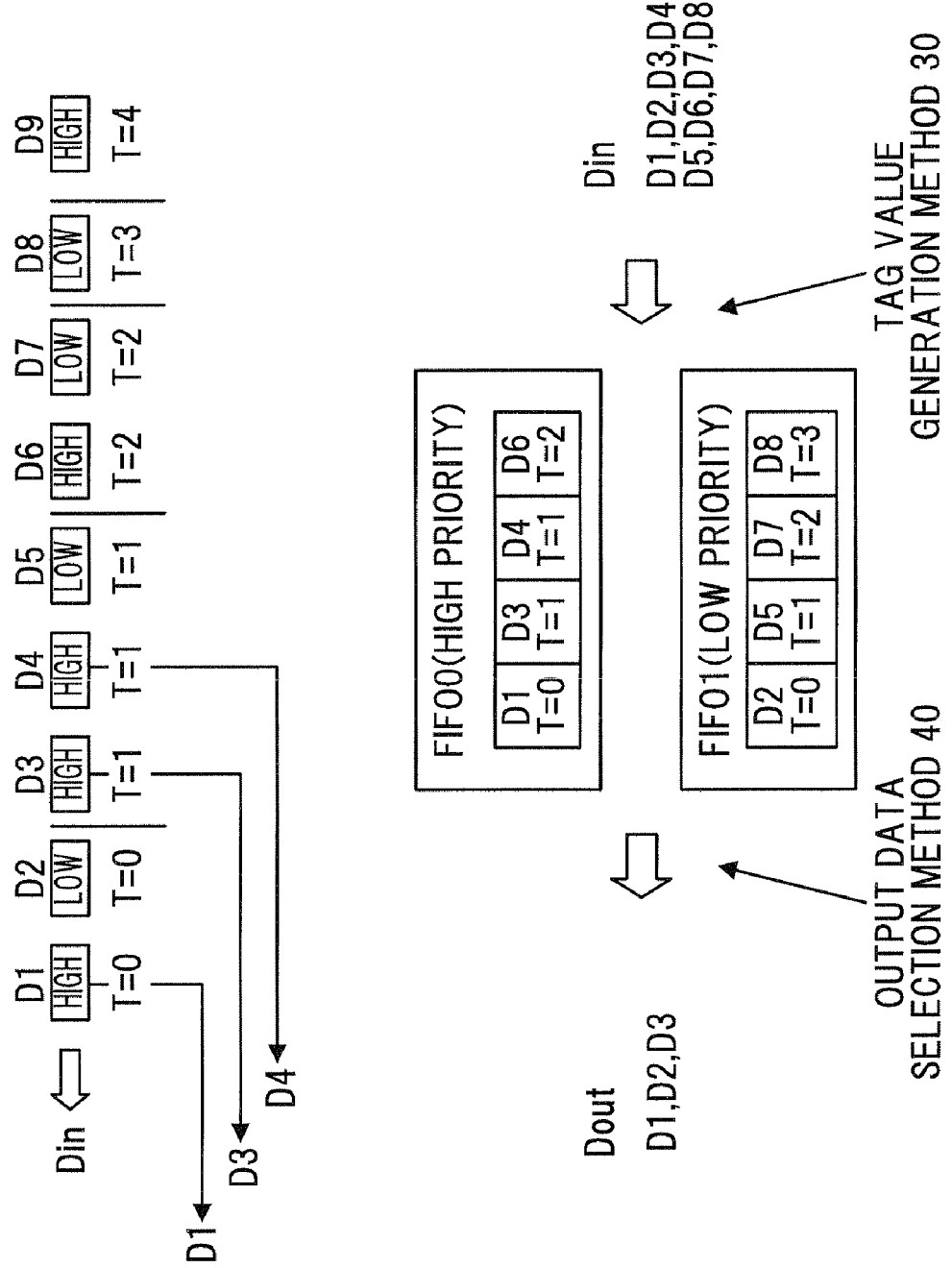
FIG. 4 illustrates an exemplary operation of a data buffer device.
Figure 5:
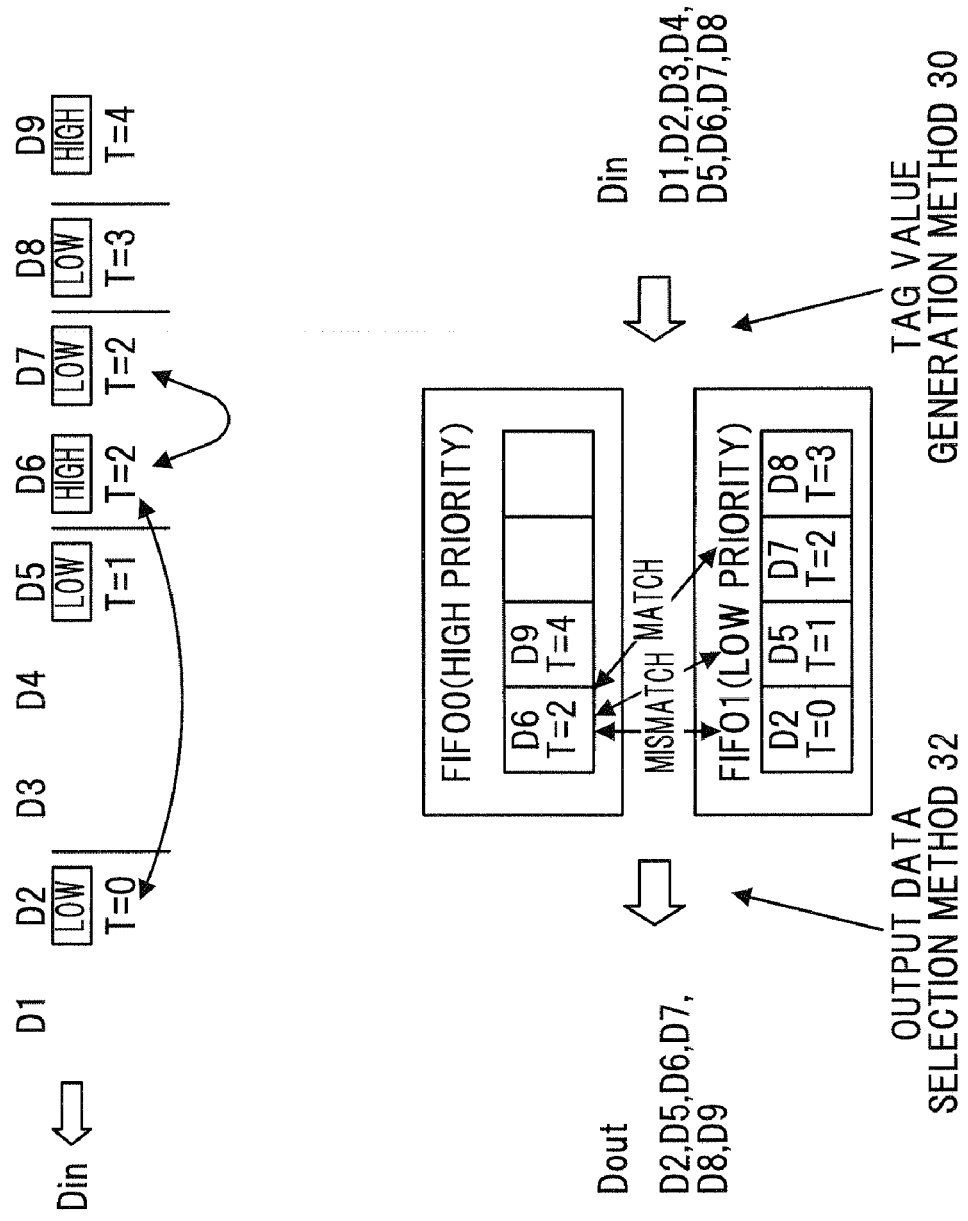
FIG. 5 illustrates an exemplary operation of a data buffer device.

Each of FIGS. 3, 4 and 5 illustrates an exemplary operation of a data buffer device. For example, n may be 2. The data buffer device illustrated in FIGS. 3, 4 and 5 includes two buffer units. FIG. 3 illustrates an operation in an ordinary output mode. FIG. 4 illustrates an operation in a passing mode. FIG. 5 illustrates an operation in an ordinary mode after a passing mode. Buffer units include a FIFO0 with a high priority and a FIFO1 with a low priority. Because of n=2, the tag values Tn−1 to T1 include T1 (hereinafter referred to as a "tag value T").

In FIG. 3, data D1 to D9 are input as input data Din in sequence. The data D1, D3, D4 and D6 each having a high priority are stored in the buffer unit FIFO0 with the high priority in the order in which the data is input. The data D2, D5, D7 and D8 each having a low priority are stored in the buffer unit FIFO1 with the low priority in the order in which the data is input.

The tag value T for the low-priority buffer unit FIFO1, which serves as a reference buffer, is generated according to a tag value generation method indicated by 30 in FIG. 3. Each time data is input to the low-priority buffer unit FIFO1 serving as the reference buffer, the tag value is incremented by one (+1) and an incremented value is assigned as the tag value of the next input data. Thus, the tag value T is changed to a different value in response to the input of data to the low-priority buffer unit FIFO1 serving as the reference buffer, and the different value is provided as the tag value corresponding to the data that is next input. The tag value T may be decremented by one (−1). When data is input to the high-priority buffer unit FIFO0, i.e., to a buffer other than the reference buffer, the tag value T is maintained at the same value.

In the case of the input data D1 to D9 illustrated in FIG. 3, the tag value T=0 is assigned to both the data D1 and D2. Because the data D2 is input to the low-priority buffer unit FIFO1, the tag value is changed to T=1 that is assigned to the next data D3. Hence, the tag value T=1 is assigned to the subsequent data D3, D4 and D5. Because the data D5 is data having the low priority, the tag value T=2 is assigned to the next data D6. Because the data D7 is data having the low priority, the tag value T=3 is assigned to the next data D8. Because the data D8 is data having the low priority, the tag value T=4 is assigned to the next data D9.

Data are output from the output circuit according to the output data selection method 32 in FIG. 3. The tag values T of the data at respective heads of the buffer units FIFO0 and FIFO1 are compared with each other. If the tag values T are not matched with each other, the data having the tag value T and stored in the FIFO1, serving as the reference buffer, is selected. If the tag values T are matched with each other, the data in the buffer unit FIFO0 other than the FIFO1, serving as the reference buffer, is selected.

The data D1 to D8 are output as output data Dout in the order in which the data was input. Although the input data are stored in the separate buffer units FIFO0 and FIFO1 depending on their priorities, which one of the buffer units includes the head data, which was input earlier, may be determined by comparing the tag values with each other. A determination module may include a simple hardware circuit or a simple software process in order to execute the determination as to whether the tag values are matched with each other.

FIG. 4 illustrates an exemplary operation in a passing output mode when the low-priority buffer unit FIFO1 has been stopped from outputting data. Input data D1 to D9 may be substantially the same as or similar to the data illustrated in FIG. 3. The tag value T may be generated according to the tag value generation method indicated by 30 in FIG. 3. The input data are written into two buffer units FIFO0 and FIFO1. The low-priority buffer unit FIFO1 stops outputting the data for some reason. The high-priority data D1, D3 and D4 in the high-priority buffer unit FIFO0 are output as the output data Dout in sequence prior to the data in the low-priority buffer unit FIFO1 which stops outputting. Thus, the output circuit selects the data in the high-priority buffer unit FIFO0 according to an output selection method 40 in FIG. 4, regardless of the tag values T. In FIG. 4, the data D1, D3 and D4 are output from the buffer unit FIFO0.

When the high-priority buffer unit FIFO0 stops outputting, the data in the low-priority buffer unit FIFO1 are output if the data in the low-priority buffer unit FIFO1 is input earlier that the data in the high-priority buffer unit FIFO0. Otherwise, no data may be output.

Data in a designated buffer unit may be output. For example, one of buffer units FIFO may stop outputting, while data may be output from the other buffer unit FIFO.

FIG. 5 illustrates an exemplary operation in an ordinary output mode after a passing output mode. In FIG. 4, the data D1, D3 and D4 are output from the high-priority buffer unit FIFO0 prior to the data D2 in the low-priority buffer unit FIFO1. In FIG. 5, the data D6 and D9 are stored in the high-priority buffer unit FIFO0. The tag values T corresponding to data D6 and D9 may be respectively 2 and 4.

The tag values T of respective head data in the two buffer units FIFO0 and FIFO1 are compared with each other according to the output data selection method in FIG. 3 for an ordinary output mode. If the tag values T are not matched with each other (i.e., mismatch), the data in the low-priority buffer unit FIFO1 serving as the reference buffer is selected. If the tag values T are matched with each other, the data in the buffer unit FIFO0 other than the FIFO1 serving as the reference buffer FIFO1 is selected. In FIG. 5, the data D2 is selected. Then, the tag values T of the data D5 and the data D6 are compared with each other. Because those tag values T are not matched with each other, the data D5 in the low-priority buffer unit FIFO1 is selected. Thereafter, the tag values T of the data D7 and the data D6 are compared with each other. Because those tag values T are matched with each other (T=2), the data D6 in the high-priority buffer unit FIFO0 is selected.

Thus, when the operation mode is returned to the ordinary output mode from the passing output mode, the tag values of respective head data in the buffer units are compared with each other to detect which data has been input at the earliest time. When the operation mode is returned to the ordinary output mode from the mode other than the ordinary output mode, data are output in an order in which the data is input. Switching between the ordinary output mode and the passing output mode or the mode other than the ordinary output mode may be made at desired timing.

When there are four stages of buffer units FIFO, a number of tag values may be set to a suitable number for discriminating the four stages of buffer units FIFO and the input data. Therefore, five kinds of tag values are successively generated herein. For example, the tag value T may be cyclically generated in order of 0, 1, 2, 3 and 4 while being incremented by one (+1). The tag value T may also be successively generated by being decremented one by one (−1 for each time) from 4. The tag value T may be successively set to in the range of from 0 to 10 by being incremented two by two (+2 for each time).

The tag value may be set to the high-priority buffer unit, which is one of the two buffer units, serving as the reference buffer. In that case, each time data is input to the high-priority buffer unit, the tag value is changed and a changed value is provided as a tag value of the next input data.

Figure 6:
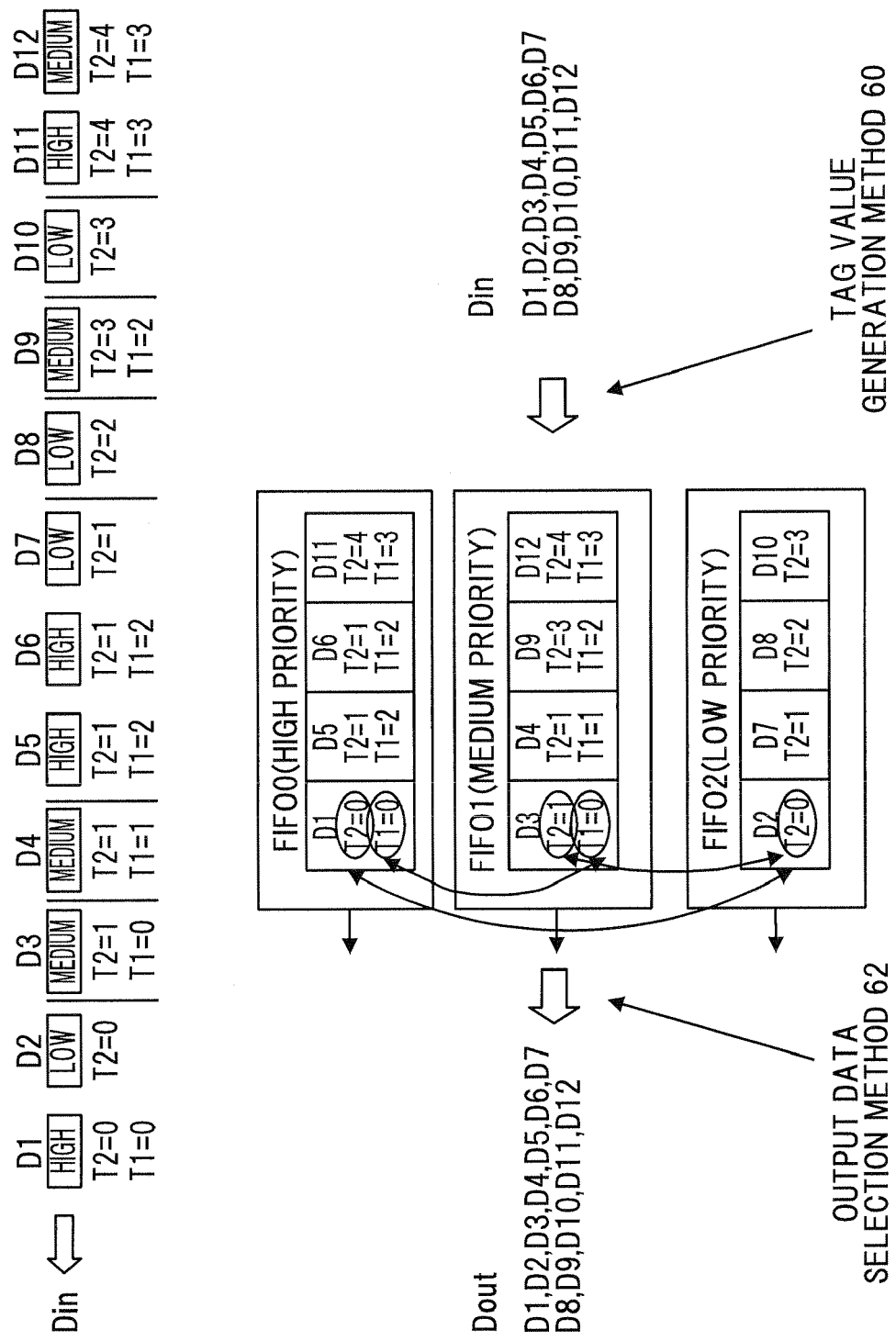
FIG. 6 illustrates an exemplary operation of a data buffer device.
Figure 7:
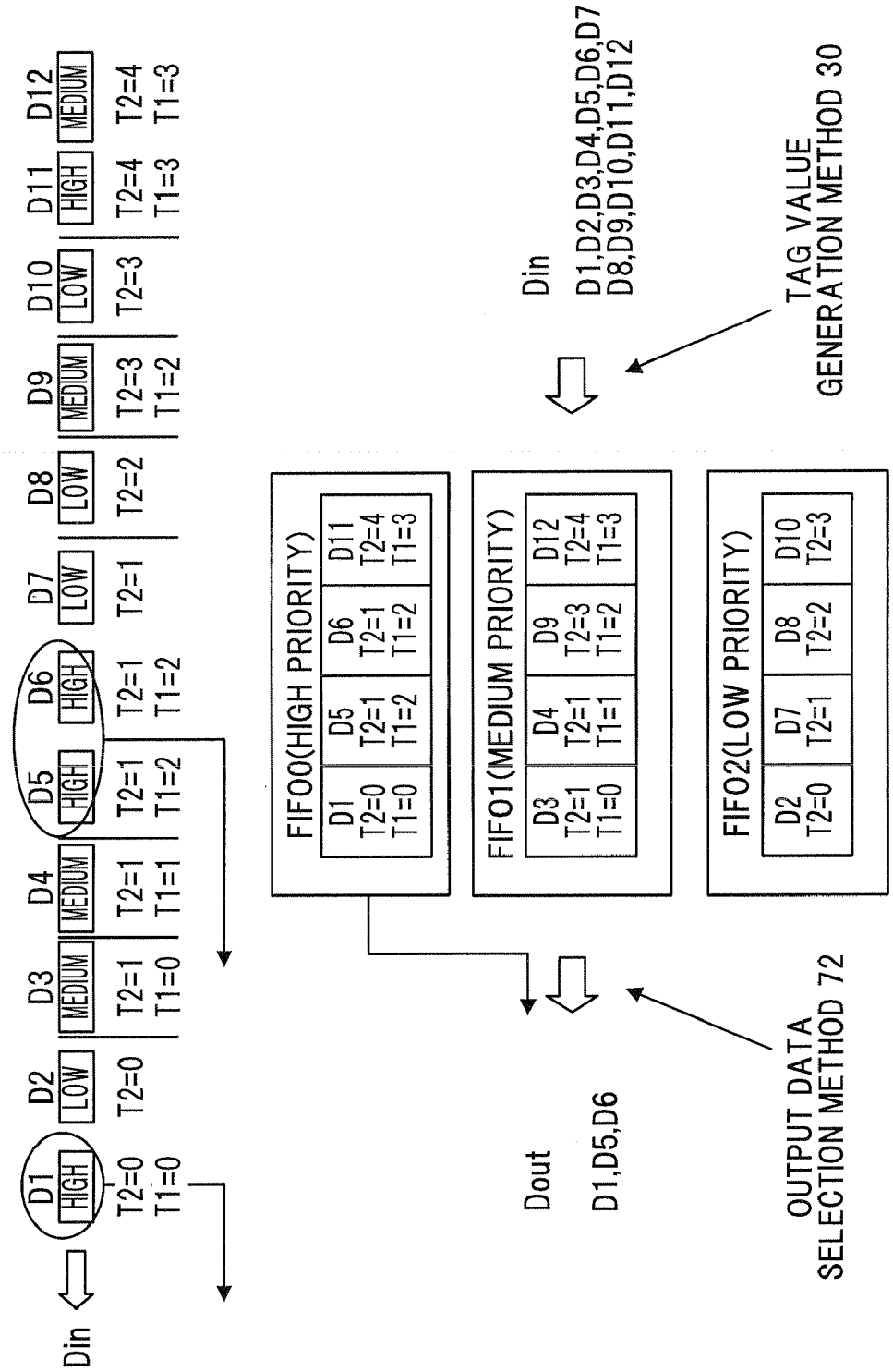
FIG. 7 illustrates an exemplary operation of a data buffer device.
Figure 8:
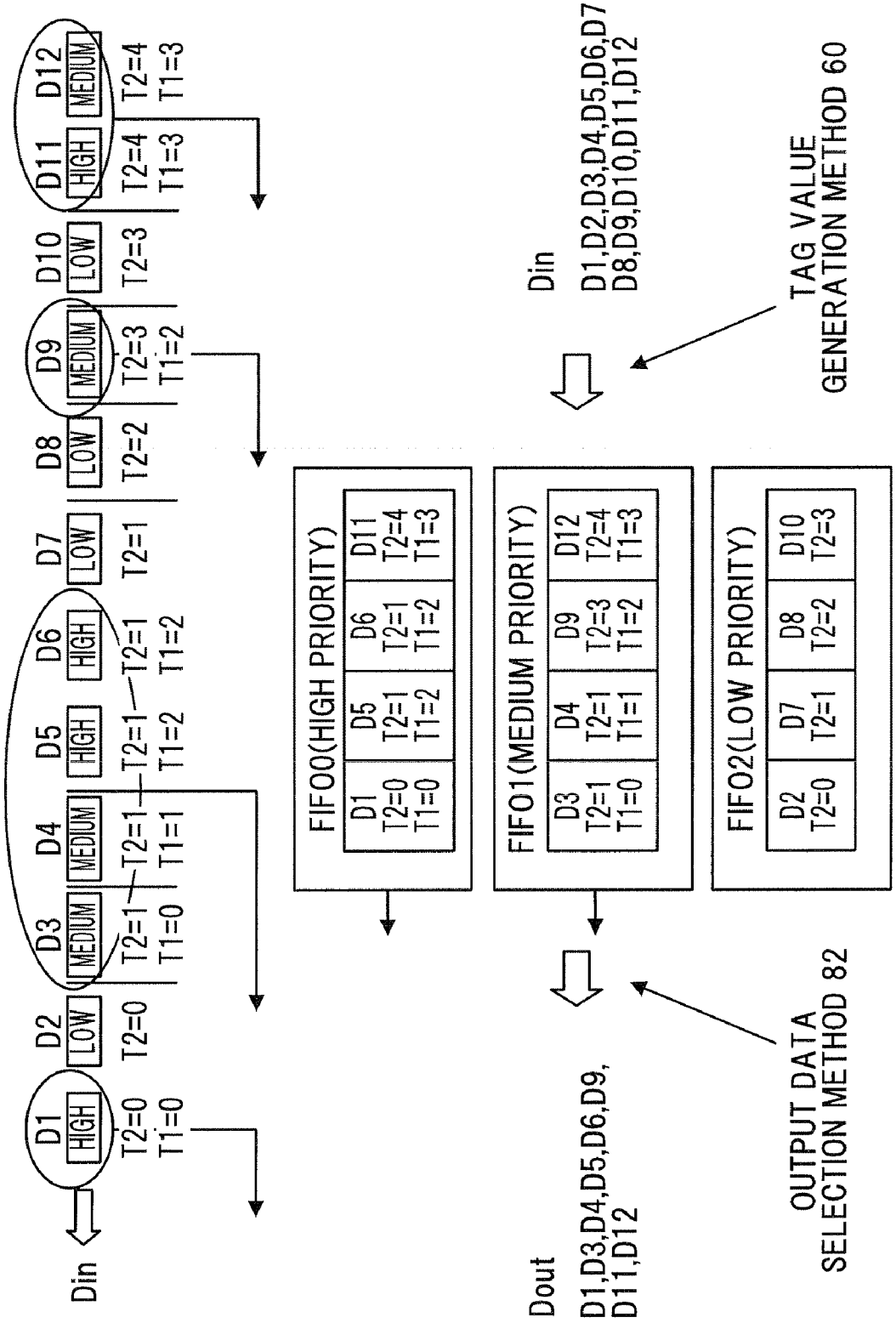
FIG. 8 illustrates an exemplary operation of a data buffer device.
Figure 9:
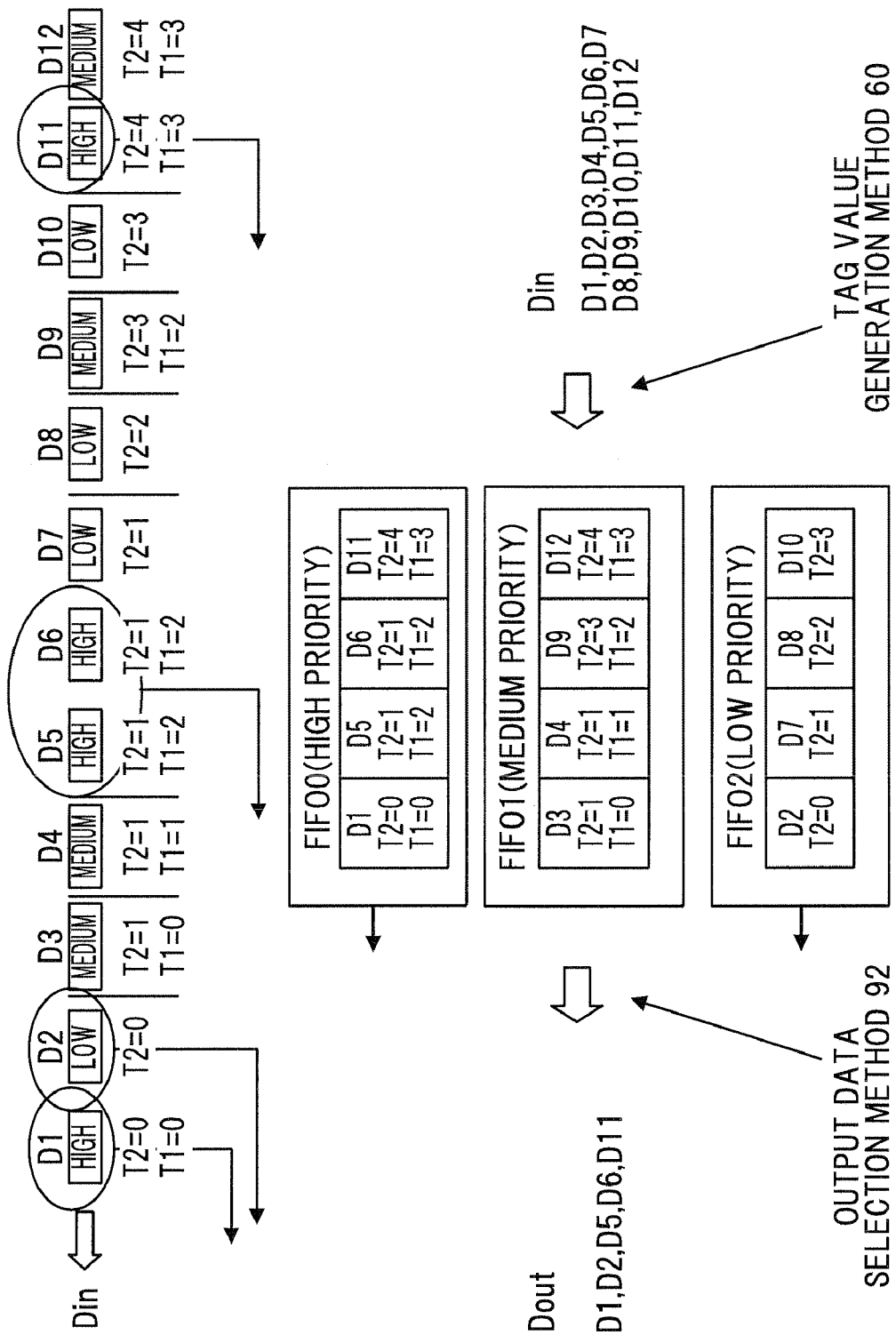
FIG. 9 illustrates an exemplary operation of a data buffer device.
Figure 10:
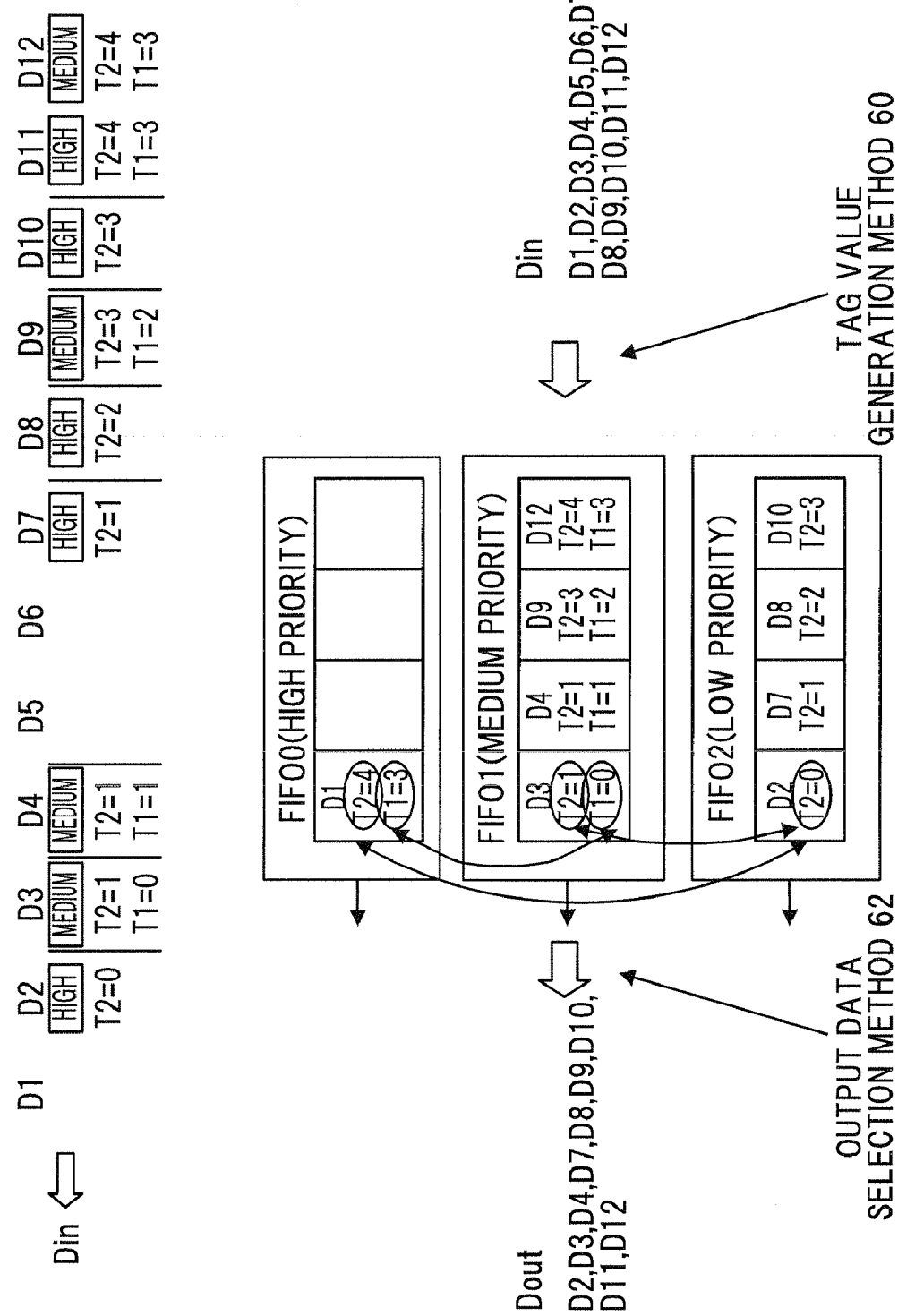
FIG. 10 illustrates an exemplary operation of a data buffer device.

Each of FIGS. 6, 7, 8, 9 and 10 illustrates an exemplary operation of a data buffer device. The data buffer device illustrated in FIGS. 6 to 10 represents the case of n=3. The buffer device includes three buffer units. FIG. 6 illustrates the operation in the ordinary output mode. FIGS. 7 to 9 illustrate the operation in the passing operation mode. FIG. 10 illustrates the operation in the ordinary output mode after the passing output mode. Buffer units include a FIFO0 with a high priority, a FIFO1 with a medium priority, and a FIFO2 with a low priority. The tag values Tn−1 to T1 are provided as a tag value T1 for the buffer unit FIFO2 serving as the reference buffer, and a tag value T2 that is used for the buffer unit FIFO1.

FIG. 6 illustrates the operation in the ordinary output mode. In FIG. 6, data D1 to D12 are input as input data Din while a data priority (high, medium or low) is assigned to each input data. Each time the input data is input to the buffer unit FIFO2 which is assigned with a relatively lower priority and which serves as the reference buffer or the buffer unit FIFO1, an input circuit (not illustrated) increments the corresponding tag value T2 or T1 by one (+1) according to a tag value generation method 60 in FIG. 6. The tag value T2 specifies the sequence of inputting data to the buffer units FIFO1 and FIFO0 which are assigned with relatively higher priorities, when the low-priority buffer unit FIFO2 serves as the reference buffer. When the input data is input to the reference buffer FIFO2, the tag value T2 is incremented by one (+1) and an incremented value is provided as the tag value T2 of the next input data. The tag value T1 specifies the sequence of inputting data to the high-priority buffer unit FIFO0 when the medium-priority buffer unit FIFO1 serves as the reference buffer. When the input data is input to the reference buffer FIFO1, the tag value T1 is incremented by one (+1) and an incremented value is provided as the tag value T1 of the next input data. The tag value T1 is assigned to the data stored in the buffer units FIFO0 and FIFO1, but it may not be assigned to the data stored in the buffer unit FIFO2.

In FIG. 6, because the data D2, D7, D8 and D10 have the low priority, the tag values T2 of the next data D3, D8, D9 and D11 are each incremented by one (+1). Because the data D3, D4 and D9 have the medium priority, the tag values T1 of the next data D4, D5 and D11 are each incremented by one (+1). Because the data D10 subsequent to the data D9 has the low priority, the tag value T1 of the subsequent data D11 is incremented by one (+1).

In the ordinary output mode, an output circuit (not illustrated) performs comparisons among the tag values T2 and between the tag values T1 of respective head data in the buffer units according to an output data selection method 62 in FIG. 6, to determine which data has been input at the earliest time. The output circuit compares the tag value T2 of the head data in the low-priority buffer unit FIFO2, which serves as the reference buffer, with the tag values T2 of the head data in the buffer units FIFO1 and FIFO0 with higher priorities. If the tag values T2 are all not matched with each other, it is determined that the data in the reference buffer has been input at the earliest time. If at least one pair of tag values T2 are matched with each other, it is determined that the data in one of the buffer units FIFO1 and FIFO0 with the relatively higher priorities has been input at the earliest time.

If the tag values T2 are all not matched with each other, the comparison of the tag values comes to end. If at least one pair of the tag values is matched with each other, the tag value T1 of the head data in the medium-priority buffer unit FIFO1, which now serves as the reference buffer, is compared with the tag value T1 of the head data in the high-priority buffer unit FIFO0. If the tag values T1 are not matched with each other, it is determined that the head data in the reference buffer FIFO1 has been input at the earliest time. If both the tag values T1 are matched with each other, it is determined that the head data in the high-priority buffer unit FIFO0 has been input at the earliest time.

The tag value T2 of the data D2 is compared with the tag values T2 of the data D3 and D1. The tag value T2 of the data D2 is matched with the tag value T2 of the data D1. Accordingly, the tag value T1 of the data D3 is compared with the tag value T1 of the data D1. Because the tag values T1 are matched with each other, it is determined that the data D1 has been input at the earliest time. The data D1 is output from the high-priority buffer unit FIFO0.

Then, the tag value T2 of the data D2 is compared with the tag values T2 of the data D3 and D5. Because the tag values T2 are all not matched with each other, it is determined that the data D2 has been input at the earliest time. The data D2 is output from the low-priority buffer unit FIFO2. Then, the tag value T2 of the data D7 is compared with the tag values T2 of the data D3 and D5. Because the tag values T2 are all matched with each other, the tag value T1 of the data D3 is compared with the tag value T1 of the data D5. Because the tag values T1 are not matched with each other, it is determined that the data D3 has been input at the earliest time. The data D3 is output from the medium-priority buffer unit FIFO1. In a similar manner, the data in the three buffer units are output in an order in which data has been input based on the comparison of the tag values. Thus, the three buffer units have substantially the same as or similar function to that of a single FIFO.

FIG. 7 illustrates the passing output mode when the medium-priority buffer unit FIFO1 and the low-priority buffer unit FIFO2 stop outputting. The input data Din are stored in the three buffer units FIFO0, FIFO1 and FIFO2. When the medium-priority buffer unit FIFO1 and the low-priority buffer unit FIFO2 stop outputting, the data in the high-priority buffer unit FIFO0 are output prior to the data in the buffer units FIFO1 and FIFO2 with lower priorities. Thus, the data D1, D5 and D6 in the high-priority buffer unit FIFO0 are output according to an output data selection method 72 in FIG. 7, regardless of the tag values.

FIG. 8 illustrates the passing output mode when the low-priority buffer unit FIFO2 stops outputting. The input data Din are stored in the three buffer units FIFO0, FIFO1 and FIFO2. When the low-priority buffer unit FIFO2 stops outputting, the data in both the high-priority buffer unit FIFO0 and the medium-priority buffer unit FIFO1 are output prior to the data in the low-priority buffer unit FIFO2. The data in the high-priority buffer unit FIFO0 and the medium-priority buffer unit FIFO1 are output in an order in which the data has been input based on the comparison of the tag values T1.

According to an output data selection method in FIG. 8, the output circuit compares the tag value T1 of the data in the high-priority buffer unit FIFO0 with the tag value T1 of the data in the medium-priority buffer unit FIFO1. If the tag values T1 are not matched with each other, the data in the medium-priority buffer unit FIFO1 is output. If the tag values T1 are matched with each other, the data in the high-priority buffer unit FIFO0 is output. In FIG. 8, the data D1, D3, D4, D5, D6, D9, D11 and D12 are output in sequence based on the comparison of the tag values T1. Thus, the data in the buffer units FIFO and FIFO1 are output prior to the data in the low-priority buffer unit FIFO2 which stops outputting.

FIG. 9 illustrates the passing output mode when the medium-priority buffer unit FIFO1 stops outputting. The input data Din are stored in the three buffer units FIFO0, FIFO1 and FIFO2.

According to an output data selection method 92 in FIG. 9, when the medium-priority buffer unit FIFO1 stops outputting, the data in the high-priority buffer unit FIFO0 and the low-priority buffer unit FIFO2 are output in an order in which the data has been input based on the comparison of the tag values T2, and the data in the high-priority buffer unit FIFO0 are output prior to the data in the medium-priority buffer unit FIFO1. The data in the low-priority buffer unit FIFO2 may not be output prior to the data in the medium-priority buffer unit FIFO1.

In FIG. 9, the data D1 is determined as being input at the earliest time based on the comparison of the tag values T2 between the data D2 and D1, and is output first. The data D2 is then output based on the comparison of the tag values T2 between the data D2 and D5. Likewise, the data D5 and D6 are then output based on the comparison of the tag values T2. Because the data D7 in the low-priority buffer unit FIFO2 may not be output prior to the data D3 in the medium-priority buffer unit FIFO1, the data D11 in the high-priority buffer unit FIFO0 is output.

The tag value T2 of the data D7 in the low-priority buffer unit FIFO2 is compared with the tag value T2 of the data D3 in the medium-priority buffer unit FIFO1. If the tag values T2 are not matched with each other, the data D7 is output. If the tag values T2 are matched with each other, the data D7 is not selected. Thus, whether the data in the low-priority buffer unit FIFO2 has been input at the earliest time is determined based on the comparison of the tag value T2 of the data in the low-priority buffer unit FIFO2 which serves as the reference buffer, and the data in the low-priority buffer unit FIFO2 is output based on the comparison result. The outputting of data from the medium-priority buffer unit FIFO1 may be inhibited.

The data in the high-priority buffer unit FIFO0 may be selected without depending on the comparison result of the tag value T1 of the data in the medium-priority buffer unit FIFO1, which serves as the reference buffer.

FIG. 10 illustrates the operation in the ordinary output mode after return from the passing output mode. In the passing output mode illustrated in FIG. 7, for example, the data D1, D5 and D6 in the high-priority buffer unit FIFO0 are output and the data D11 remains in the high-priority buffer unit FIFO0. The comparisons between the tag values T1 and among the tag values T2 are performed according to the output data selection method 62 in FIG. 6. If the tag values are all not matched with each other, the low-priority data in the reference buffer is selected. If at least one pair of tag values is matched with each other, the data stored in the buffer, which is other than the reference buffer and which has a relatively higher priority, is selected.

In FIG. 10, the tag value T2 of the data D2 is compared with the tag values T2 of the data D3 and D11. Because those tag values T2 are all not matched with each other, the data D2 in the reference buffer is output. Then, the tag value T2 of the data D7 is compared with the tag values T2 of the data D3 and D11. Because two of the compared tag values T2 are matched with each other, the tag value T1 of the data D3 is compared with the tag value T1 of the data D11. Because the tag values T1 are not matched with each other, the data D3 is output. In a similar manner, the data D4, D7, D8, D9, D10, D11 and D12 are successively output as the output data Dout.

In FIGS. 8 and 9, the data are also output in an order in which the data has been input according to the output data selection method 62 in FIG. 6.

When the high-priority buffer unit stops outputting, or when the high-priority buffer unit and the medium-priority buffer unit stops outputting, the tag values of the data are compared with each other between one or two buffer units with relatively lower priorities and the buffer unit which stops outputting. If the buffer unit with the relatively lower priority includes the data that has been input at the earliest time, the data is output. If the buffer unit with the relatively lower priority does not include the data that has been input at the earliest time, no data may be output.

The data may be output from only a particular one of the buffer units. In this case, the comparison of the tag values may be omitted. After returning to the ordinary output mode, the remaining data may be output in the order that the remaining data was input based on the comparison of the tag values.

Figure 11:
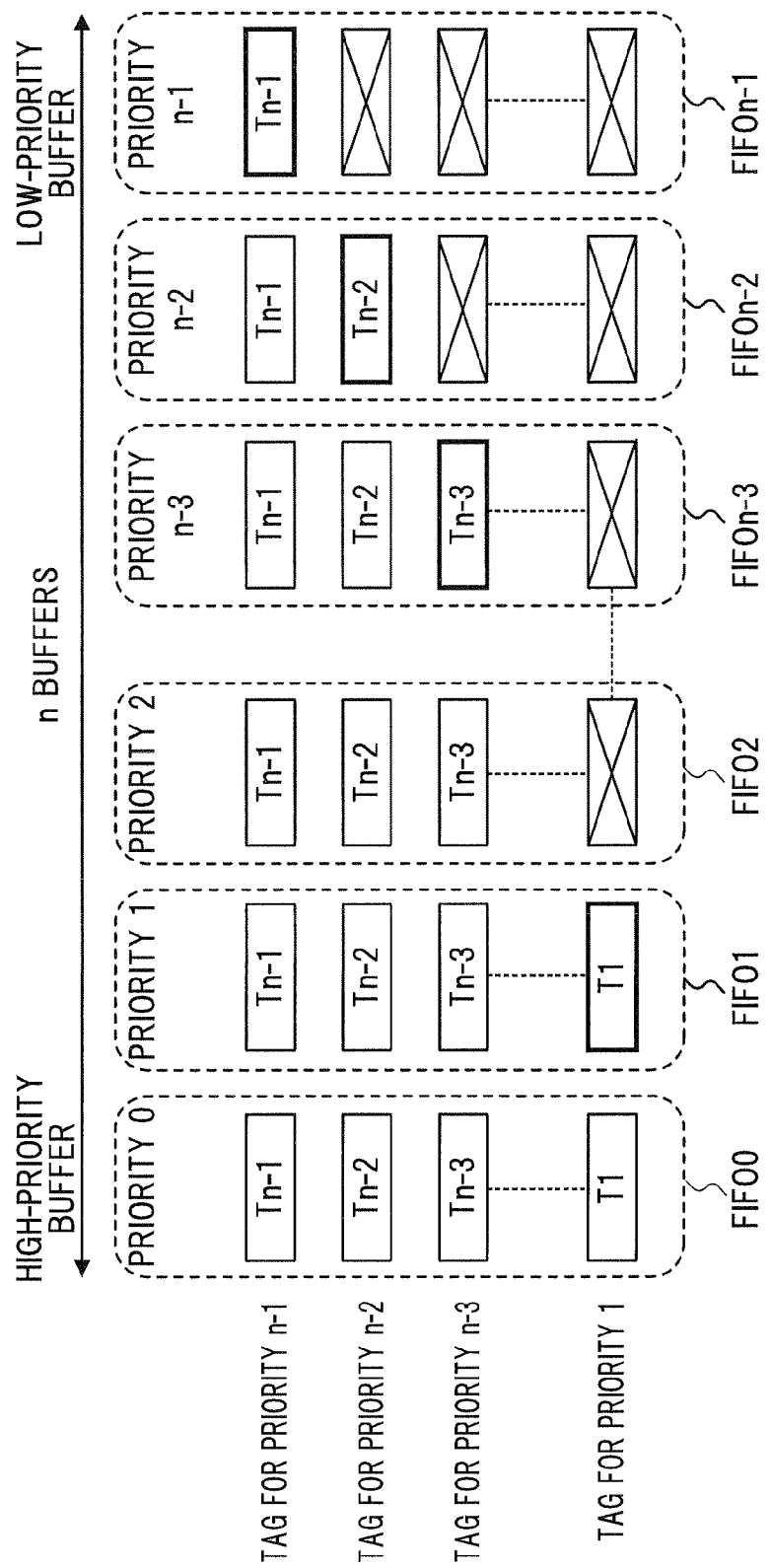
FIG. 11 illustrates exemplary tag values.
Figure 12:
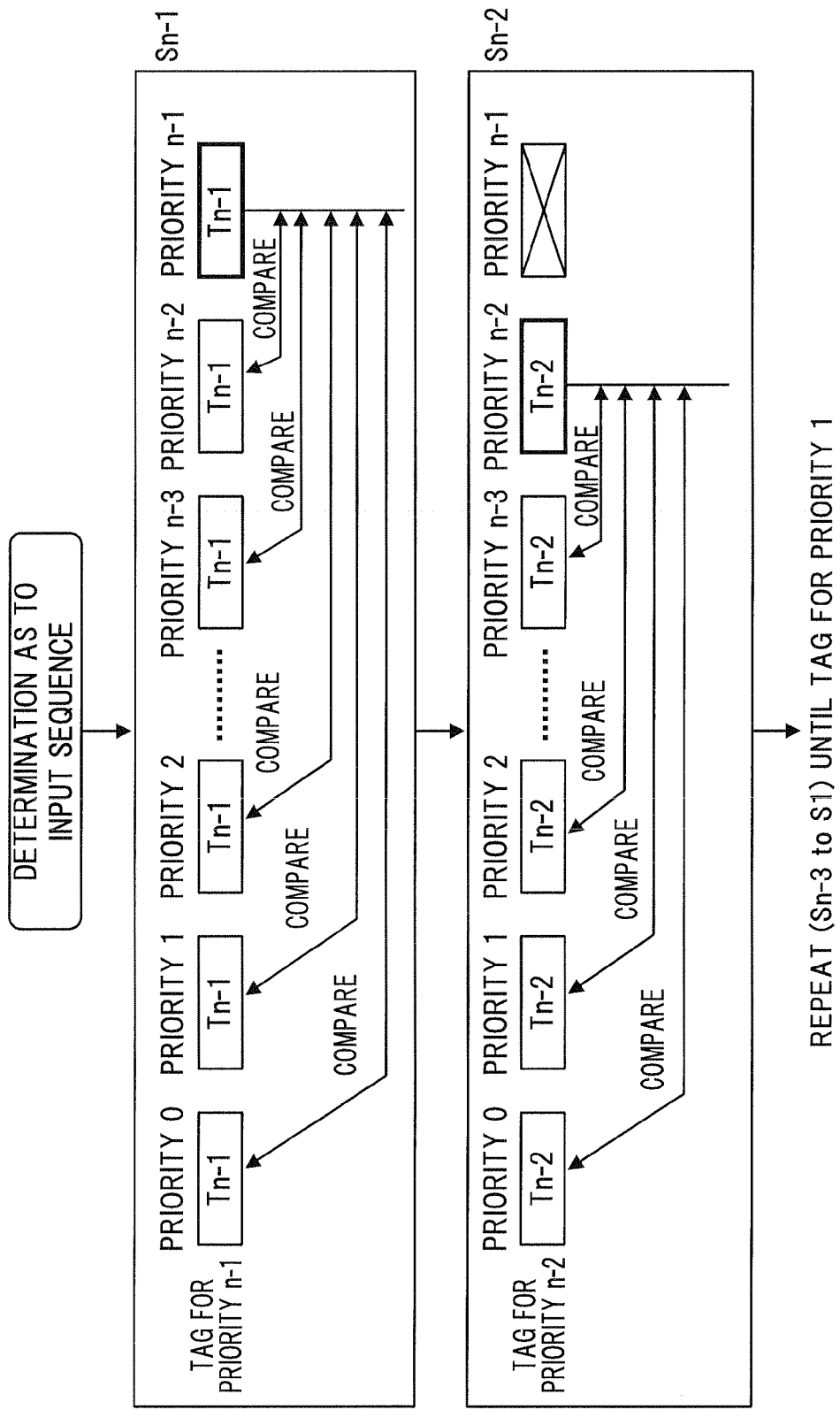
FIG. 12 illustrates exemplary tag values.

Each of FIGS. 11 and 12 illustrates exemplary tag values used in the data buffer device. The data buffer device illustrated in FIG. 11 includes n buffer units. In the example of FIG. 12, the comparison of the tag values is performed and data are output based on the comparison results in the data buffer device including the n buffer units.

In FIG. 11, there are provided n buffer units from a first buffer unit FIFO0 with the highest priority to an n-th buffer unit FIFOn−1 with the lowest priority. A smaller suffix numeral represents a higher priority, and a larger suffix numeral represents a lower priority. Whether data in the n-th buffer unit FIFOn−1 has been input earlier than respective data in the buffer units FIFO0 to FIFOn−2 with higher priorities than the n-th buffer unit FIFOn−1 is determined based on an n-th tag value Tn−1 of the data in the n-th buffer unit FIFOn−1 that serves as the reference buffer. The n-th tag value Tn−1 is assigned to each of FIFOn−1 to FIFO0.

Whether data in the (n−1)-th buffer unit FIFOn−2 has been input earlier than respective data in the buffer units FIFO0 to FIFOn−3 with higher priorities than the (n−1)-th buffer unit FIFOn−2 is determined based on an (n−1)-th tag value Tn−2 of the data in the (n−1)-th buffer unit FIFOn−1 that serves as the reference buffer. The (n−1)-th tag value Tn−2 is assigned to each of FIFOn−2 to FIFO0.

Tag values Tn−3 to T1 are used to determine the data input sequence in a similar manner and are assigned to respective data in the reference buffer and the buffers with relatively higher priorities. Data stored in the highest-priority buffer unit FIFO0 may not have tag values.

Each time data is input to the reference buffer unit, the tag value corresponding to the reference buffer unit is changed and a changed value is provided as the tag value of the next input data. The tag value of the data in the reference buffer unit is compared with the tag values of respective data in the buffer units with relatively higher priorities. When the data in the other buffer units are input after the data in the reference buffer unit has been input, the tag value of the data in the reference buffer unit is not matched with all of the tag values of the other buffer units.

In FIG. 12, the tag values of respective head data in the buffer units are compared with each other. The compassion of the tag values is performed from the tag value Tn−1 corresponding to the lowest-priority buffer unit FIFOn−1 which serves as the reference buffer to the tag value T1 in order.

In operation Sn−1, the tag value Tn−1 of the data in the reference buffer FIFOn−1 is compared with the tag values Tn−1 of respective data in the buffer units FIFOn−2 to FIFO0 with higher priorities. If the tag values Tn−1 are all not matched with each other, it is determined that the data in the reference buffer FIFOn−1 has been input earlier. The outputting of determination data based on the comparison of the tag values comes to an end. If at least one pair of tag values are matched with each other, the data in the reference buffer FIFOn−1 is not determined to being input earlier. Hence, it is determined which one of the data in the other buffer units FIFOn−2 to FIFO0 has been input earlier.

In operation Sn−2, the tag value Tn−2 of the data in the reference buffer FIFOn−2 is compared with the tag values Tn−2 of respective data in the buffer units FIFOn−3 to FIFO0 with higher priorities. If the tag values are all not matched with each other, the data in the reference buffer FIFOn−2 is determined as being input earlier. The outputting of determination data based on the comparison of the tag values comes to an end. If at least one pair of tag values are matched with each other, it is not determined that the data in the reference buffer FIFOn−2 has been input earlier. Hence, the tag values corresponding to respective data in the other buffer units are compared with each other.

The determination as to the input sequence is likewise repeated until reaching the tag value T1 of the data in the reference buffer FIFO1. If it is detected in any of the determination operations that all the tag values differ from each other, the determination is completed.

The determination as to whether the tag values are matched with each other may be executed by a simple hardware circuit or a simple program.

The buffer unit with a higher priority may be set as the reference buffer unit and, when data is input to the buffer unit with the higher priority, the tag value assigned to the next input data is incremented by one (+1). In FIGS. 11 and 12, for example, the buffer unit FIFO0 is assigned with the lowest priority and the buffer unit FIFOn−1 is assigned with the highest priority. The comparison of the tag values may be executed in substantially the same or similar manner as to that illustrated in FIG. 12.

Figure 13:
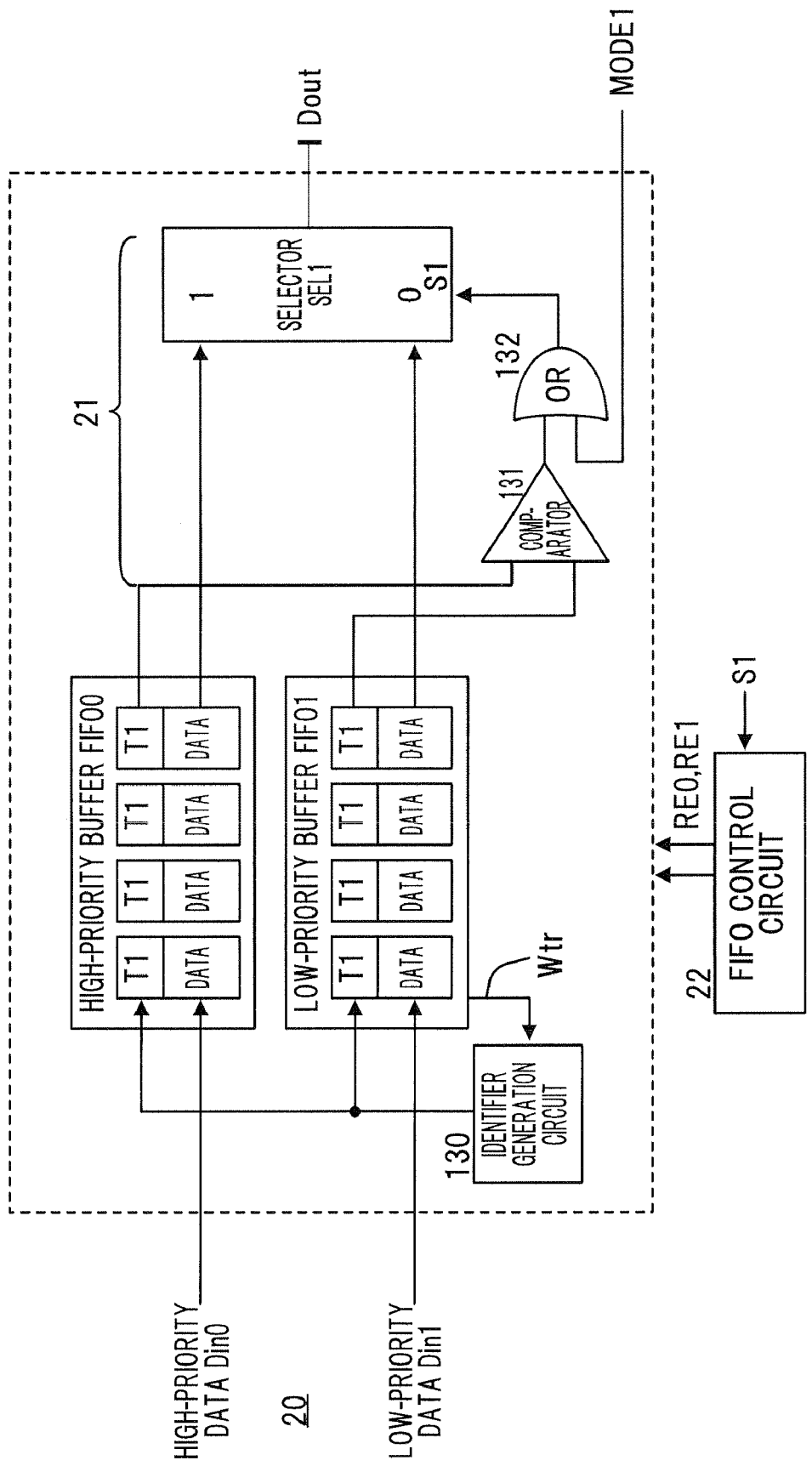
FIG. 13 illustrates an exemplary data buffer device.

FIG. 13 illustrates an exemplary data buffer device. The data buffer device illustrated in FIG. 13 includes two buffer units. The input circuit 20 (not illustrated in FIG. 13, see FIG.

2) sorts input data per priority. High-priority input data Din0 are written into the high-priority buffer unit FIFO0, and low-priority input data Din1 are written into the low-priority buffer unit FIFO1. An identifier generation circuit 130 may be included in the input circuit 20 illustrated in FIG. 2. The identifier generation circuit 130 changes the tag value T1, serving as an identifier, in response to a write trigger signal Wtr that is generated each time data is written into the low-priority buffer unit FIFO1. The identifier T1 may be the tag value T1 when the low-priority buffer unit FIFO1 serves as the reference buffer. The changed tag value T1 is written into the buffer unit FIFO1 or FIFO0 together with the next input data.

The output circuit 21 illustrated in FIG. 13 includes a comparator 131 for comparing the tag values T1 with each other, an OR gate 132, and a selector SEL1 for selecting data in one of the buffer units FIFO0 and FIFO1. In the ordinary output mode, a mode signal MODE1 is at an L-level, e.g., at a 0-level and an output S1 of the OR gate 132 is provided as a comparison result of the comparator 131. The comparator 131 compares the tag values T1 of respective head data in the buffer units with each other. If the tag values T1 are not matched with each other, the comparator 131 outputs "0", and if the tag values T1 are matched with each other, the comparator 131 outputs "1". The output of the comparator 131 is used as a selection signal S1 for the selector SEL1. Accordingly, if the tag values T1 are not matched with each other, S1=0 is provided and the selector SEL1 selects the data in the low-priority buffer unit FIFO1. Hence, the output data Dout is output from the low-priority buffer unit FIFO1. If the tag values T1 are matched with each other, S1=1 is provided and the selector SEL1 selects the data in the high-priority buffer unit FIFO0. Hence, the output data Dout is output from the high-priority buffer unit FIFO0.

The selection signal S1 is supplied to the FIFO control circuit 22. The FIFO control circuit 22 supplies the read-enable signal RE0 or RE1 to the selected buffer unit in accordance with the selection signal S1. In response to the read-enable signal RE0 or RE1, the read pointer in the corresponding buffer unit is incremented and data is output.

When the low-priority buffer unit FIFO1 stops outputting and the passing output mode is set, the mode signal MODE1=1 is provided. The selection signal S1 as the output of the OR gate 132 takes "1", whereby the data in the high-priority buffer unit FIFO0 is selected by the selector SEL1 and is output as the output data Dout regardless of the tag values (i.e., regardless of the output of the comparator 131).

Figure 14:
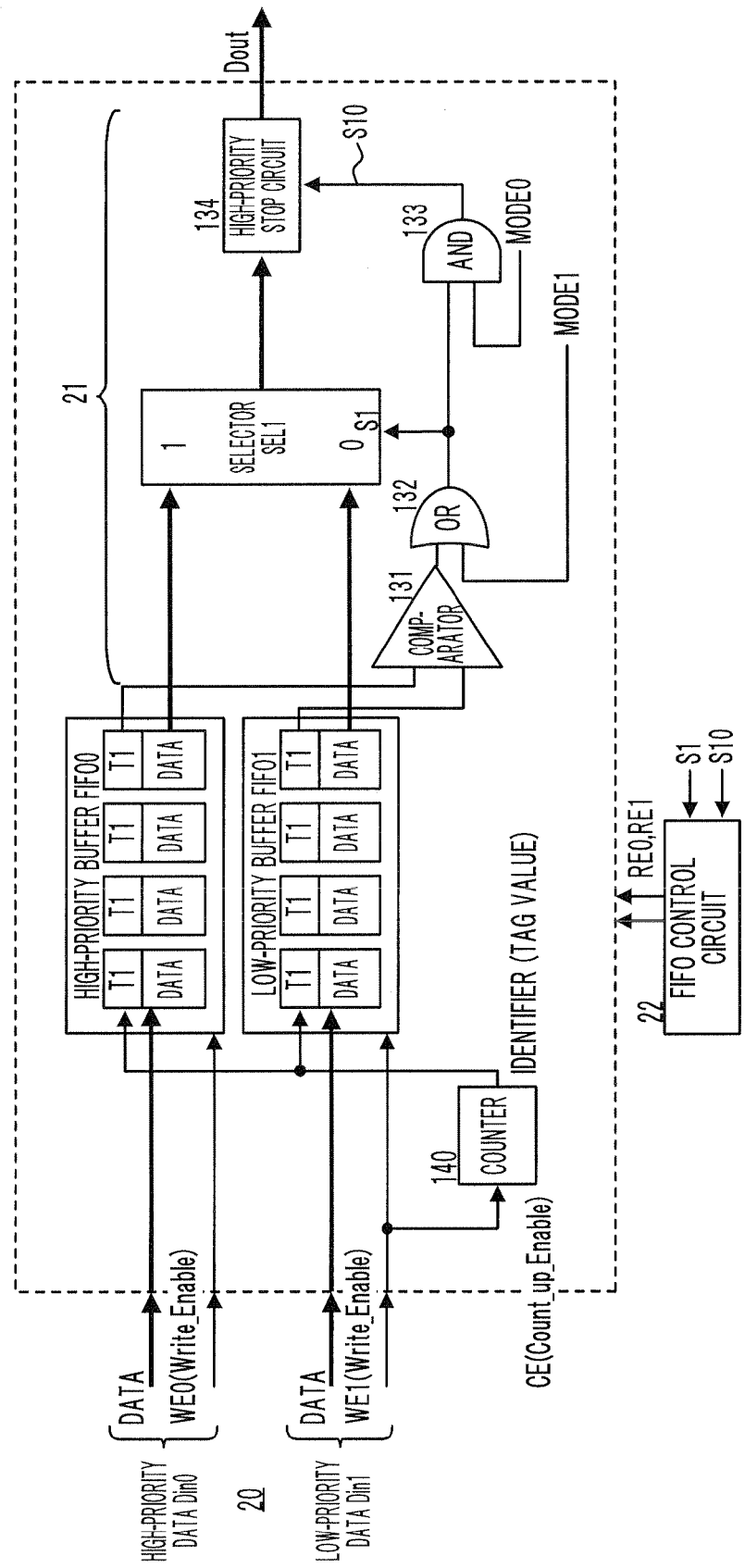
FIG. 14 illustrates an exemplary data buffer device.

FIG. 14 illustrates an exemplary data buffer device. The data buffer device illustrated in FIG. 14 includes two buffer units. The high-priority buffer unit FIFO0 and the low-priority buffer unit FIFO1 are provided. The high-priority (input) data Din0 and the low-priority (input) data Din1 both supplied from the input circuit 20 (not illustrated in FIG. 14, see FIG. 2) are supplied to the corresponding buffer units FIFO0 and FIFO1, respectively.

In FIG. 14, the high-priority data Din0 and the low-priority data Din1 are supplied, respectively, to the buffer units FIFO0 and FIFO1 together with the corresponding write-enable signals WE0 and WE1. The data are written into the buffer units in response to the write-enable signals WE0 and WE1. The write-enable signal WE1 is supplied as a count-up-enable signal CE to a counter 140. In response to the count-up-enable signal CE, the counter 140 increments its count value by one (+1). The count value of the counter 140 is written as the tag value T1 into the buffer unit together with the next input data. The counter 140 may correspond to the identifier generation circuit 130 illustrated in FIG. 13.

The output circuit 21 illustrated in FIG. 14 includes the comparator 131, the OR gate 132, and the selector SEL1. The mode signal MODE1 is supplied to the output circuit 21. The ordinary output mode and the passing output mode both illustrated in FIG. 14 may be substantially the same as those illustrated in FIG. 13. The passing output mode is set when the low-priority buffer unit FIFO1 stops outputting.

The output circuit 21 illustrated in FIG. 14 further includes an AND gate 133 for receiving the selection signal S1 and the mode signal MODE0, and a high-priority stop circuit 134 for stopping output data of the selector SEL1 in response to an output signal S10 of the AND gate 133. When the high-priority buffer unit FIFO0 stops outputting, the mode signals MODE1=0 and MODE0=1 are provided. When the comparator 131 detects a match between the tag values T1 based on the comparison of the tag values T1 and outputs "1", the output S1 of the OR gate 132 is also provided as "1" and the selector SEL1 selects the data in the high-priority buffer unit FIFO0. Because "1" of the selection signal S1 and "1" of the mode signal MODE0 are supplied to the AND gate 133 and the output signal S10 of the AND gate 133 takes "1", the high-priority stop circuit 134 makes the selector SEL1 output. Therefore, the data in the high-priority buffer unit FIFO0 may not be output as the output data Dout.

When the comparator 131 detects a mismatch between the tag values T1 based on the comparison of the tag values T1 and outputs "0", the selection signal S1 is provided as "0" and the selector SEL1 selects the data in the low-priority buffer unit FIFO1. Because the output signal S10 of the AND gate 133 takes "0", the high-priority stop circuit 134 outputs the data selected by the selector SEL1. Data in the low-priority buffer unit FIFO1, which is input earlier than the data in the high-priority buffer unit FIFO0, are output, but the subsequent data may be not output.

If the tag values are generated when the high-priority buffer unit FIFO0 serves as the reference buffer unit, the relationship between selection inputs for the selection signal S1 applied to the selector SEL1 may be the reverse of that described in FIGS. 13 and 14. The priorities of the buffer units FIFO0 and FIFO1 may be reversed.

Figure 15:
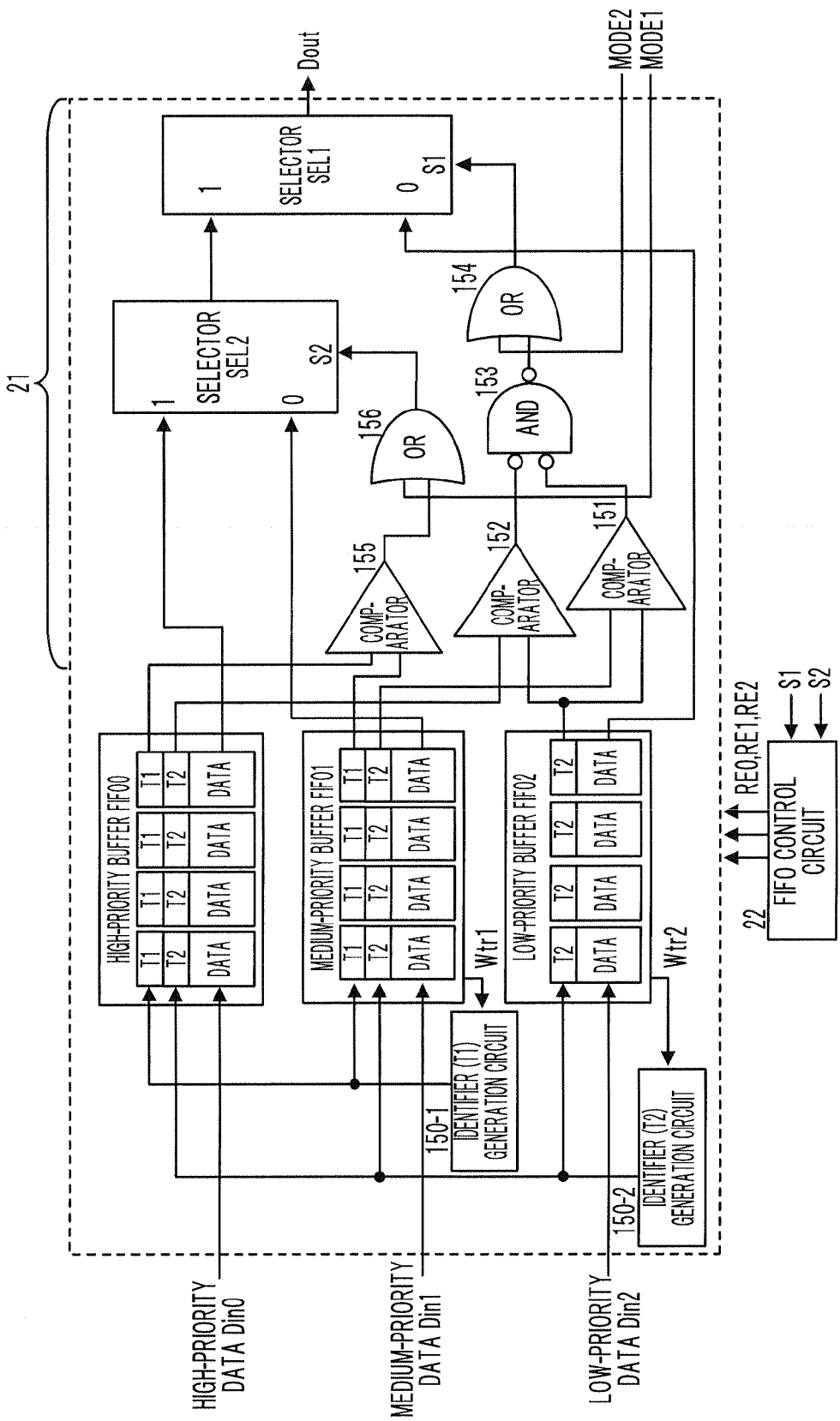
FIG. 15 illustrates an exemplary data buffer device.

FIG. 15 illustrates an exemplary data buffer device. The data buffer device illustrated in FIG. 15 includes three buffer units. Three buffer units FIFO0, FIFO1 and FIFO2 are provided, and input data Din0 (high priority), Din1 (medium priority) and Din2 (low priority) corresponding to respective priorities of the three buffer units are stored therein together with the tag values T2 and T1. The tag values T2 are stored in the three buffer units, and the tag values T1 are stored in the high-priority buffer unit FIFO0 and the medium-priority buffer unit FIFO1.

Each time data is written into the low-priority buffer unit FIFO2, an identifier generation circuit 150-2 changes the tag value T2, serving as an identifier, in response to a write trigger signal Wtr2. Each time data is written into the medium-priority buffer unit FIFO1, an identifier generation circuit 150-1 changes the tag value T1, serving as an identifier, in response to a write trigger signal Wtr1.

The output circuit 21 includes a comparator 151, a comparator 152, an AND gate 153, an OR gate 154, and a selector SEL1 in order to compare the tag values T2 with each other. The output circuit 21 further includes a comparator 155, an OR gate 156, and a selector SEL2 in order to compare the tag values T1 with each other.

A mode signal MODE2 for instructing the low-priority buffer unit FIFO2 to stop outputting and a mode signal MODE1 for instructing the medium-priority buffer unit FIFO1 to stop outputting are supplied to the output circuit 21.

In the ordinary output mode, the mode signals MODE2=0 and MODE1=0 are provided. Each of the comparators 151 and 152 compares the tag values T2 with each other. If the tag values T2 are not matched with each other, each comparator outputs "0". Therefore, both inputs to the AND gate 153 are provided as "1", whereby an output of the AND gate 153 becomes "0" and the selection signal S1 takes "0". In FIG. 15, circles drawn at input terminals and an output terminal of the AND gate 153 means "inverse". The selector SEL1 selects the data in the low-priority buffer unit FIFO2, whereby the output data Dout is output. When any of the comparators 151 and 152 detects a match between the tag values T2, the selection signal S1 takes "1" and the selector SEL1 selects the data in the high-priority buffer unit FIFO0 or the medium-priority buffer unit FIFO1.

The comparator 155 compares the tag values T1 with each other. If the tag values T1 are not matched with each other, the comparator 155 outputs "0". A selection signal S2 takes "0" and the selector SEL2 selects the data in the medium-priority buffer unit FIFO1. If the tag values T1 are matched with each other, the comparator 155 outputs "1". The selection signal S2 takes "1" and the selector SEL2 selects the data in the high-priority buffer unit FIFO0.

When the low-priority buffer unit FIFO2 stops outputting, the mode signals MODE2=1 and MODE1=0 are provided. The selection signal S1 takes "1". Accordingly, the selector SEL1 may not select the data in the low-priority buffer unit FIFO2 regardless of the comparison results of the comparators 151 and 152. The comparison of the tag values T1 is performed between the medium-priority data and the high-priority data.

When the low-priority buffer unit FIFO2 and the medium-priority buffer unit FIFO1 stop outputting, the mode signals MODE2=1 and MODE1=1 are provided. The selection signal S1 takes "1" and the selection signal S2 also takes "1". Accordingly, the data in the high-priority buffer unit FIFO0 is selected by the selectors SEL1 and SEL2.

When the medium-priority buffer unit FIFO1 stops outputting, the mode signals MODE2=0 and MODE1=1 are provided. The selector SEL1 selects the data in the low-priority buffer unit FIFO2 based on the comparison of the tag values T2 if the data in the low-priority buffer unit FIFO2 has been input earlier. The selection signal S2 is set to "1" and the selector SEL2 selects the data in the high-priority buffer unit FIFO0 regardless of the comparison result of the tag values T1. If the low-priority data was input earlier, the relevant low-priority data is output. If respective data are input in the sequence of the medium-priority data, the low-priority data, and the high-priority data, or input in the sequence of the medium-priority data, the high-priority data, and the low-priority data, the high-priority data is output while the medium-priority data is not output. If the high-priority data was input earlier, the relevant high-priority data is output.

The selection signals S1 and S2 are supplied to the FIFO control circuit 22. Which one of the buffer units is selected may be detected based on the selection signals S1 and S2. The read-enable signals RE0, RE1 and RE2 are supplied to the corresponding buffer units and the read pointers are updated.

Figure 16:
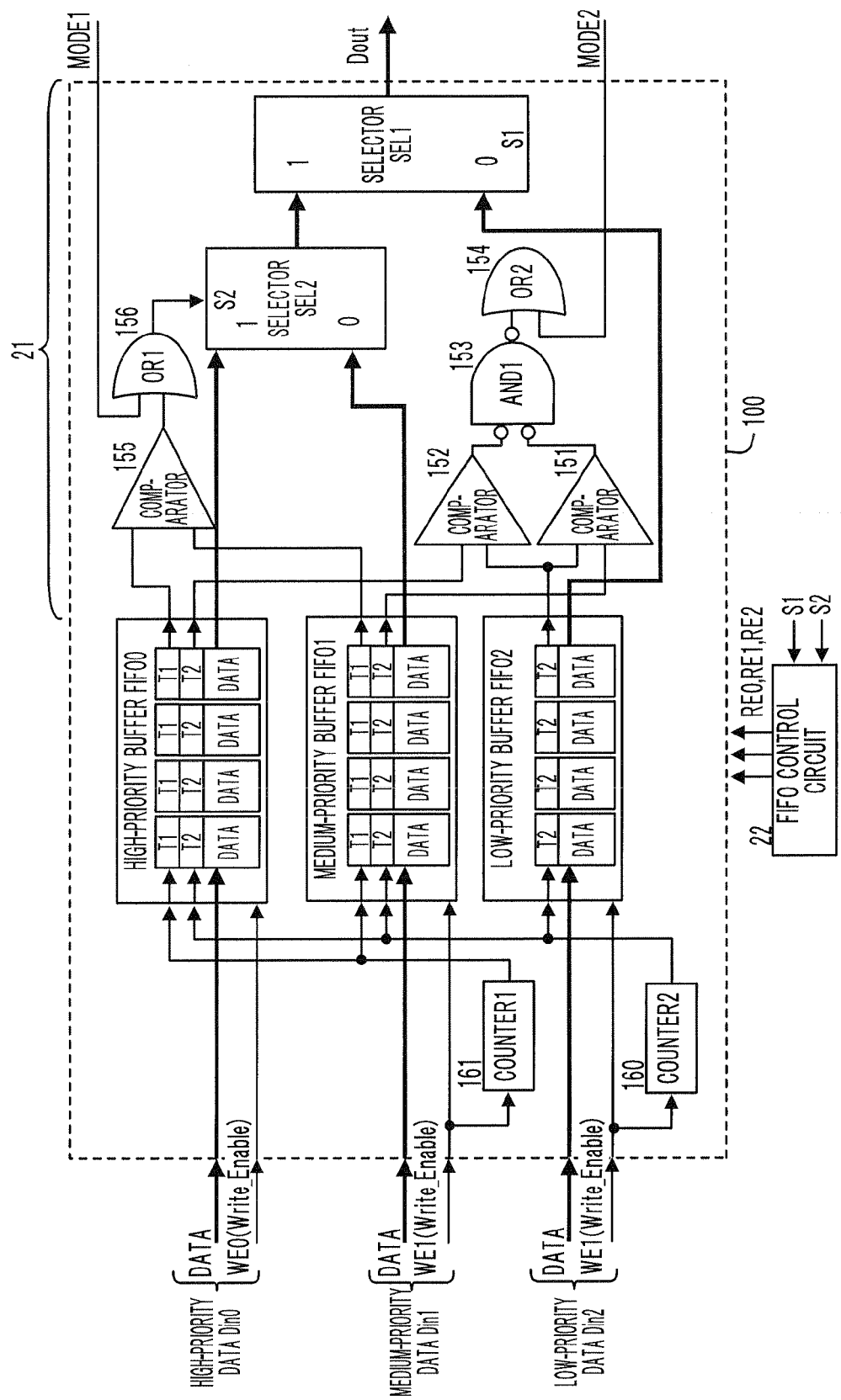
FIG. 16 illustrates an exemplary data buffer device.

FIG. 16 illustrates an exemplary data buffer device. The data buffer device illustrated in FIG. 16 includes three buffer units. The configurations and operations of the three buffer units and the output circuit, illustrated in FIG. 16, may be substantially the same as or similar to the configurations and operations of the three buffer units and the output circuit 21, which are illustrated in FIG. 15. Counters 160 and 161 are provided respectively instead of the identifier generation circuits 150-2 and 150-1 illustrated in FIG. 15. Three kinds of input data Din0 (high priority), Din1 (medium priority) and Din2 (low priority) are supplied from an input circuit (not illustrated) to the corresponding buffer units FIFO0, FIFO1 and FIFO2 together with write-enable signals WE0, WE1 and WE2, respectively. The counter 160 increments a count value by one (+1) in response to the write-enable signal WE0. The counter 161 increments a count value by one (+1) in response to the write-enable signal WE1. The tag values T2 and T1 are thus generated.

When the high-priority buffer unit is set as the reference buffer unit, in FIGS. 15 and 16, the buffer unit FIFO0 may be set to "low priority" and the buffer unit FIFO2 may be set to "high priority".

According to the PCI Express standards, for example, data transfer is performed using three types of packets called "Posted", "Completion" and "Non Posted". Those three types of packets are buffered in the link layer/transaction layer, and packet data are output from a buffer when the transfer is enabled. The above-described data buffer device may be applied to such a buffering process.

The packet data input to the buffer are transferred in an order that the packet data has been input in the ordinary operation, but the packet data may be not transferred depending on the situation of a transfer destination. Disability of transfer is called "blocking" in the PCI Express standards. When the transfer designation may not receive the packet data, a notice indicating the disability of transfer is sent from the transfer destination to a transfer source. Responsively, the data buffer stops outputting packets of the corresponding type. For example, when the transfer of a "Non Posted" packet is disabled, the "Non Posted" packet is not transferred, while a "Posted" packet and a "Completion" packet are transferred. The "Posted" packet and the "Completion" packet may be transferred, for example, prior to the "Non Posted" packet that is nontransferable. After the "Non Posted" packet has become transferable, the packets are transferred in an order that the packets have been input.

The "Posted" packet, the "Completion" packet, and the "Non Posted" packet may correspond respectively to "high priority", "medium priority", and "low priority".

Figure 17:
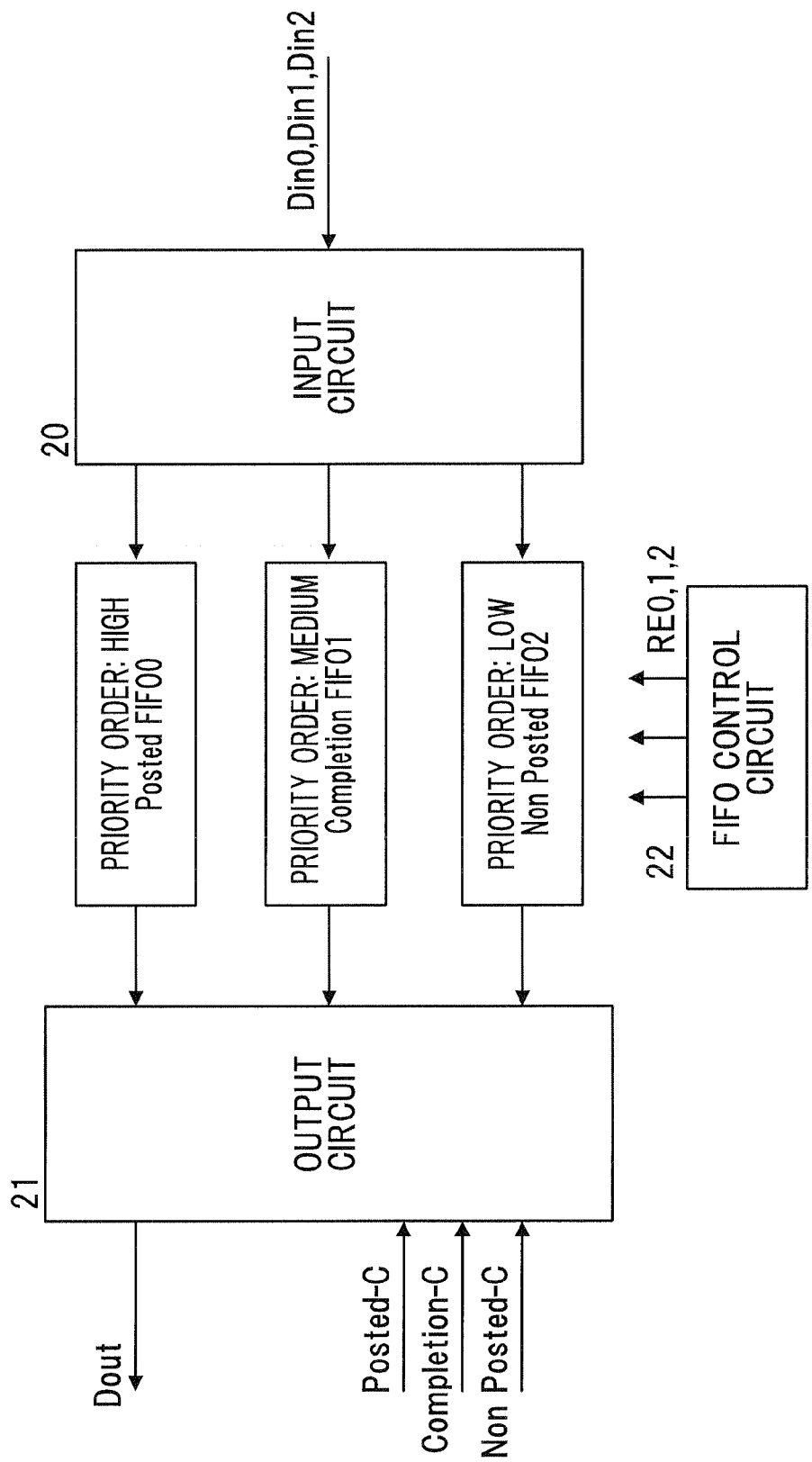
FIG. 17 illustrates an exemplary data buffer device.

FIG. 17 illustrates an exemplary data buffer device. The data buffer device illustrated in FIG. 17 may correspond to the link layer/transaction layer according to the PCI Express standards. The configuration of the data buffer device illustrated in FIG. 17 may be substantially the same as or similar to the configuration of the data buffer device illustrated in FIG. 2. The data buffer device includes three buffer units FIFO0, FIFO1 and FIFO2. The "Posted" packet, the "Completion" packet, and the "Non Posted" packet are stored in the three buffer units, respectively. Priorities are set to "high", "medium" and "low" in the order of the buffer units FIFO0, FIFO1 and FIFO2. Input data Din0, Din1 and Din2 in the packet format are input. An input circuit 20 sorts the input data into the "Posted" packet, the "Completion" packet, and the "Non Posted" packet, and writes the packets in the corresponding buffer units. The input circuit 20 generates tag values and writes the generated tag values into the corresponding buffer units.

In the ordinary operation mode, an output circuit 21 compares the tag values of respective packets in the three buffer units with each other and outputs output data Dout in an order that the packets have been input. Credit signals Posted-C, Completion-C and Non Posted-C, each of which indicates whether the relevant packet can be transferred or not, are supplied to the output circuit 21 from the transfer designation. For example, a credit signal of "0" indicates the presence of credit, and the packet data may be transferred. A credit signal of "1" indicates the absence of credit, and the packet may not be transferred. When the credit signal indicates that the transfer is disabled, the transfer of the packet data from the corresponding buffer unit is stopped, while the packet data in the other buffer units are transferred in an order in which the packet data was input. The data in one or more buffer units with relatively higher priorities are output earlier than the data in the buffer unit for which the transfer is disabled.

For example, if the credit signal for the "Non Posted" packet is set to indicate that the transfer is disabled, the tag value of the "Posted" packet and the tag value of the "Completion" packet, which have relatively high priorities, are compared with each other. If the credit signal for the "Non Posted" packet is set to indicate that the transfer is enabled, the tag values of the packets in the three buffer units are compared with each other.

Figure 18:
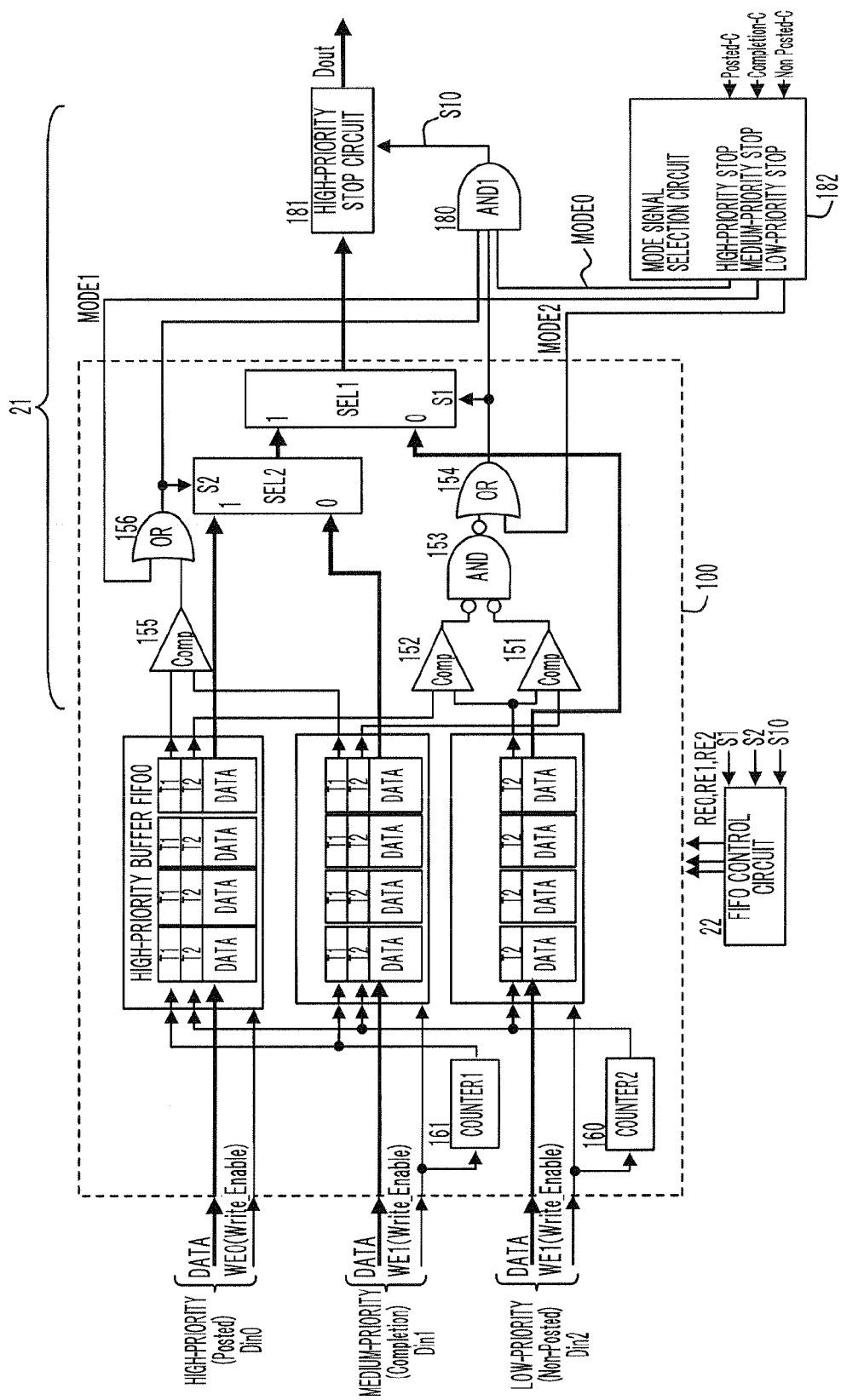
FIG. 18 illustrates an exemplary data buffer device.

FIG. 18 illustrates an exemplary data buffer device. The data buffer device illustrated in FIG. 18 may be applied to the PCI Express standards. Comparing with the data buffer device illustrated in FIG. 16, the output circuit 21 in the data buffer device illustrated in FIG. 18 additionally includes a high-priority stop circuit 181, an AND gate 180, and a mode signal generation circuit 182, which are located outside a dotted line 100. The selection signals S1 and S2 and a signal S10 are supplied to the FIFO control circuit 22. The configuration inside the dotted line 100 illustrated in FIG. 18 may be substantially the same as or similar to the configuration inside a dotted line 100 illustrated in FIG. 16.

FIG. 19 illustrates an exemplary correspondence between a credit signal and a mode signal. The mode signal generation circuit 182 generates the mode signals MODE0, MODE1 and MODE2 corresponding to the credit signals Posted-C, Completion-C and Non Posted-C, respectively. When the credit signals Posted-C, Completion-C and Non Posted-C indicate the presence of credit, the mode signals MODE0, MODE1 and MODE2 are set to, e.g., "0". When each credit signal indicates the absence of credit, the corresponding mode signal is set to, e.g., "1" and the corresponding buffer unit stops outputting.

In the data buffer devices illustrated in FIGS. 15 and 16, the ordinary output mode outputting data in an order that the data has been input is set in the case of MODE2=0 and MODE1=0. The low-priority buffer unit FIFO2 stops outputting when MODE2=1 and MODE1=0. Also, the medium-priority buffer unit FIFO1 stops outputting when MODE2=0 and MODE1=1. The low-priority buffer unit FIFO2 and the medium-priority buffer unit FIFO1 stop outputting when MODE2=1 and MODE1=1.

When the high-priority buffer unit FIFO0 stops outputting, any of the selection signals S1 and S2 is set to "0" if it is determined, based on the comparison of the tag values, that the data in the low-priority buffer unit FIFO2 or the medium-priority buffer unit FIFO1 has been input earlier. The data selected by the selectors SEL1 and SEL2 is output via the high-priority stop circuit 181. The data in the low-priority buffer unit and the medium-priority buffer unit may not be output prior to the data in the high-priority buffer unit based on the comparison of the tag values. If it is determined based on the comparison of the tag values that the data in the high-priority buffer unit FIFO0 has been input earlier, the selection signals S1 and S2 are both set to "1" and the output signal S10 of the AND gate 180 takes "1". The high-priority stop circuit 181 may not output the data in the high-priority buffer unit FIFO0, which has been selected by the selectors SEL1 and SEL2. The high-priority buffer unit FIFO0 stops outputting.

When the high-priority buffer unit FIFO0 and the medium-priority buffer unit FIFO1 stop outputting, the selection signal S2 is set to "1" while the selection signal S1 is set depending on the comparison result of the tag values. If the data in the low-priority buffer unit FIFO2 has been input earlier, the selection signal 51 set to "0" and the data in the low-priority buffer unit FIFO2 is output. If the data in the high-priority buffer unit FIFO0 has been input earlier, the selection signal S1 is set to "1". Because of S1=1, S2=1 and MODE0=1, the output signal S10 of the AND gate 180 takes "1" and the high-priority stop circuit 181 does not output the data in the high-priority buffer unit FIFO0. The data in the medium-priority buffer unit FIFO1 is not output because the selection signal S2 takes "1" (S2=1). The data in the low-priority buffer unit is output only if it has been input earlier, and may not be output prior to the data in the high-priority buffer unit and the medium-priority buffer unit.

When the high-priority buffer unit FIFO0 and the low-priority buffer unit FIFO2 stop outputting, the selection signal S1 is set to "1" while the selection signal S2 is set depending on the comparison result of the tag values. The data in the low-priority buffer unit FIFO2 may not be output. If the data in the medium-priority buffer unit FIFO1 has been input earlier, the selection signal S2 set to "0" and the data in the medium-priority buffer unit FIFO1 is output. If the data in the high-priority buffer unit FIFO0 has been input earlier, the selection signal S1 is set to "1" and the high-priority stop circuit 181 controls the data in the high-priority buffer unit FIFO0 not to be output. The data in the medium-priority buffer unit may not be output prior to the data in the high-priority buffer unit.

The input circuit and the output circuit in the data buffer device illustrated in FIG. 2 may include hardware circuits or programs that are executed by, e.g., a CPU (not illustrated).

Figure 20:
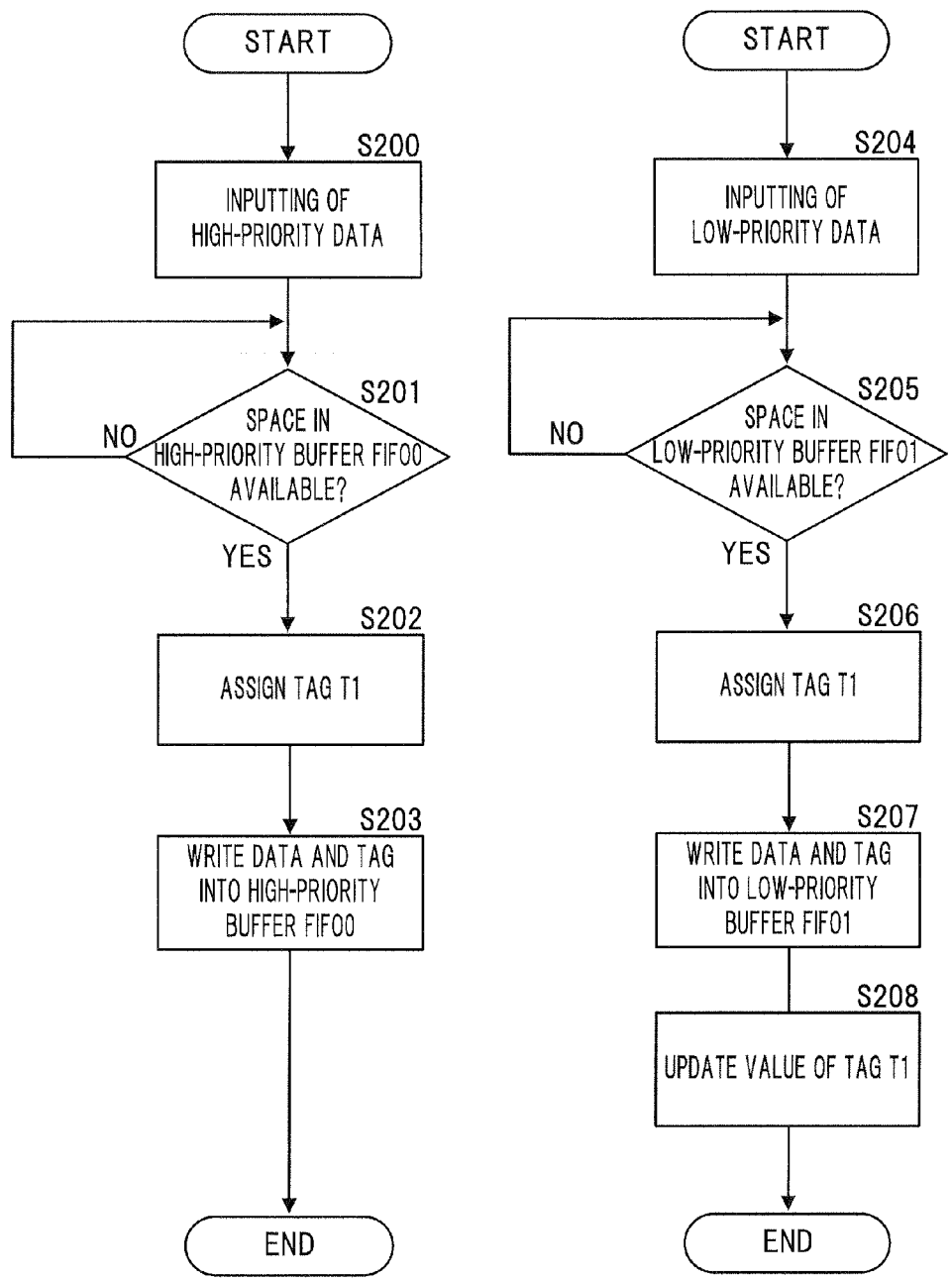
FIG. 20 illustrates an exemplary control of an input module.

FIG. 20 illustrates an example control of an input module. The input module may be included in a data buffer device. The data buffer device illustrated in FIG. 20 includes two buffer units. For example, the input circuit 20 illustrated in FIG. 2, which may correspond to the input module, includes a processor, such as a CPU, and a program memory, and the processor executes programs in the program memory.

Referring to FIG. 20, upon inputting of high-priority data (S200), if there is an available space in the corresponding high-priority buffer unit FIFO0 (YES in S201), the input module assigns the current tag value T1 to the input data (S202) and then writes the input data and the tag value T1 into the high-priority buffer unit FIFO0 (S203). Upon inputting of low-priority data (S204), if there is an available space in the corresponding low-priority buffer unit FIFO1 (YES in S205), the input module assigns the current tag value T1 to the input data (S206) and then writes the input data and the tag value T1 into the low-priority buffer unit FIFO1 (S207). The current tag value T1 is updated (S208). The tag value T1 assigned to the next input data is thus updated.

Figure 21:
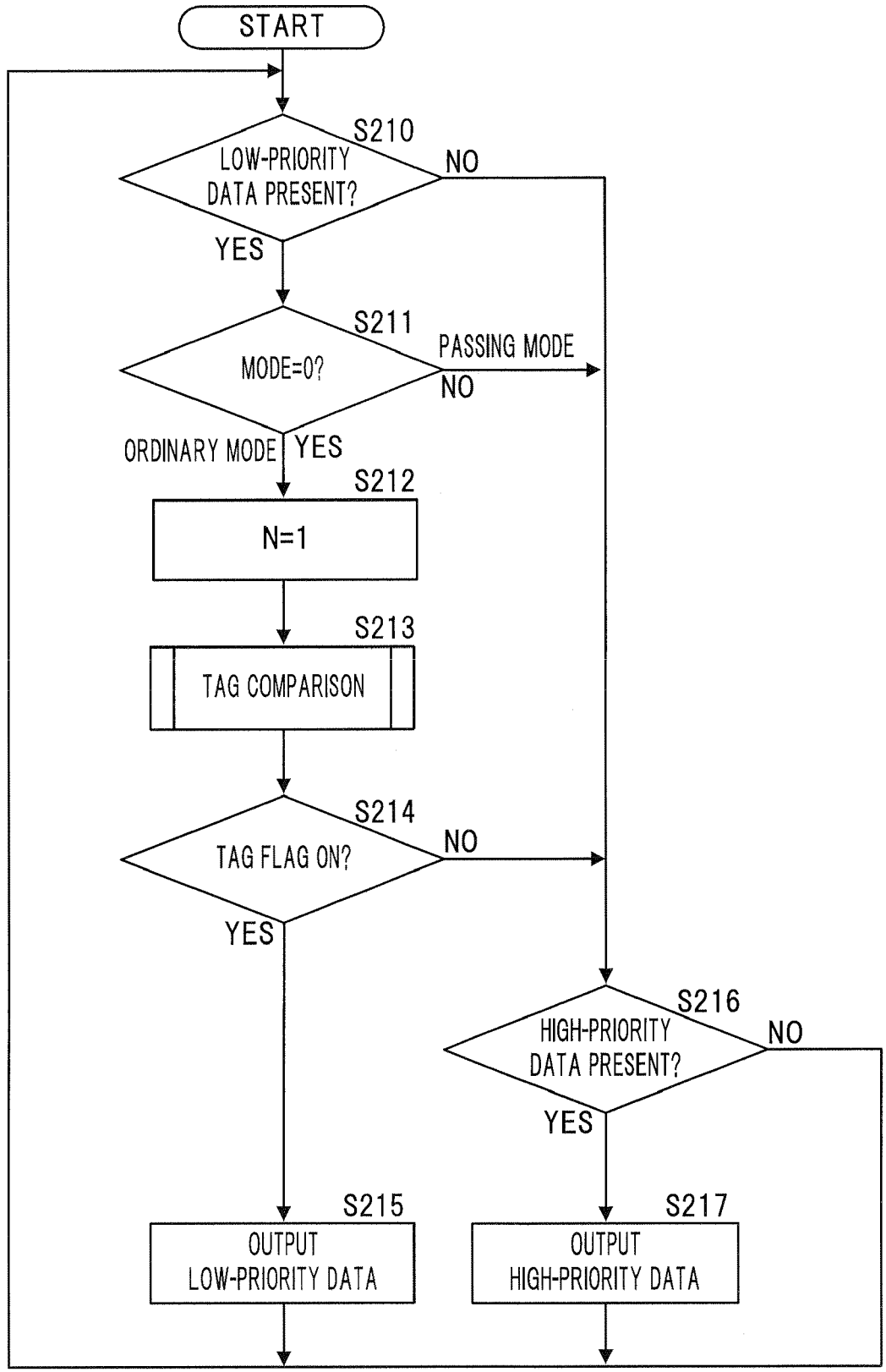
FIG. 21 illustrates an exemplary control of an output module.

FIG. 21 illustrates an exemplary control of an output module. The output module may be included in the data buffer device. The data buffer device illustrated in FIG. 21 includes two buffer units. For example, the output circuit 21 illustrated in FIG. 2, which may correspond to the output module, includes a processor, such as a CPU, and a program memory, and the processor executes programs in the program memory.

The output module compares the tag value T1 of the data in the low-priority buffer unit FIFO1 with the tag value T1 of the data in the high-priority buffer unit FIFO0, thereby to determine whether the data in the low-priority buffer unit FIFO1 has been input earlier. If the data in the low-priority buffer unit FIFO1 was input earlier, the data in the low-priority buffer unit FIFO1 is output, and if not so, the data in the high-priority buffer unit FIFO0 is output. In FIG. 21, if the low-priority data is present in the corresponding buffer (YES in S210), the output module sets the number of the buffer unit FIFO, which serves as the reference buffer, as an argument N (e.g., N=1) (S212) and compares the tag values with each other (S213) in the ordinary output mode (YES in S211).

Figure 22:
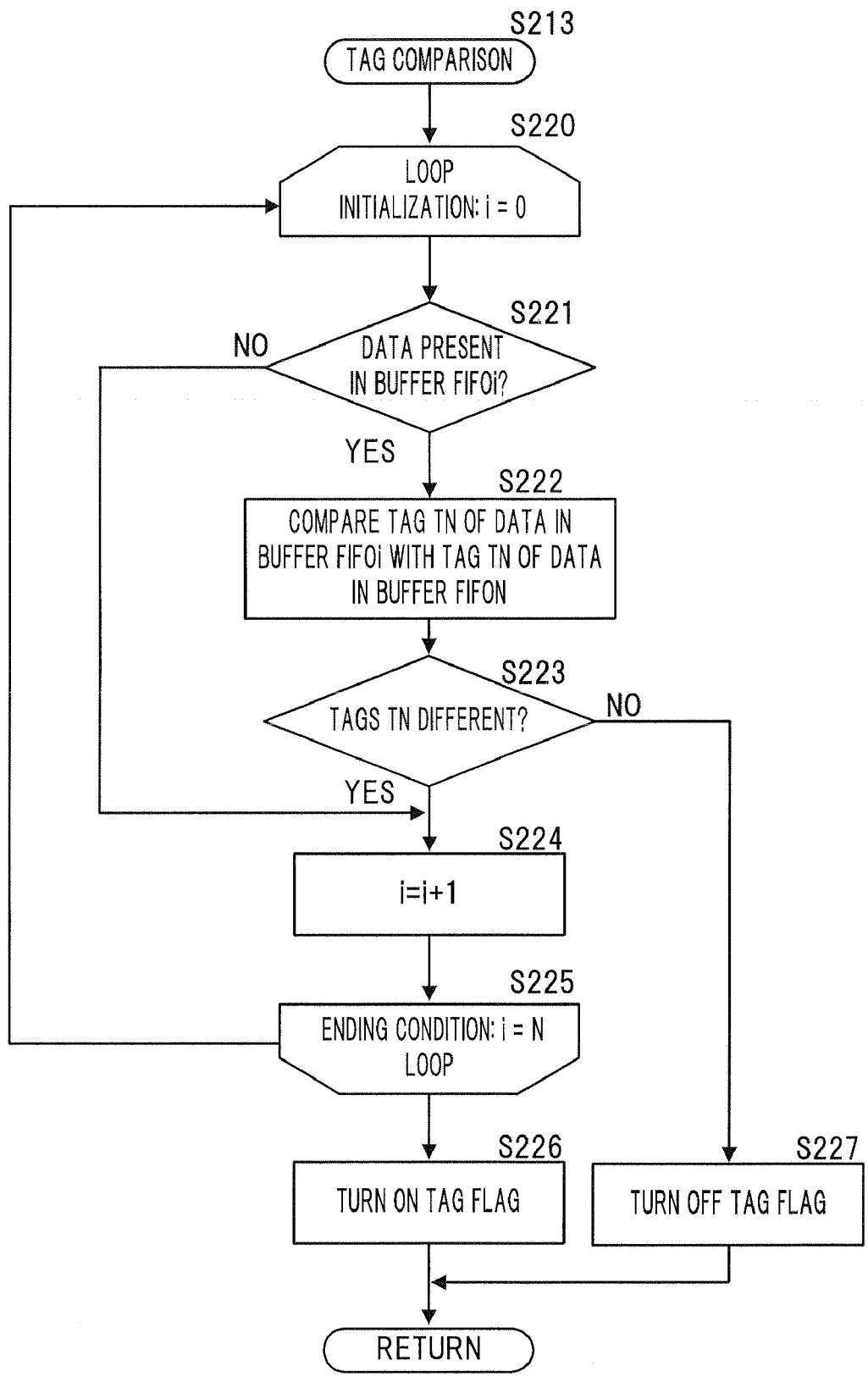
FIG. 22 illustrates an exemplary process of comparing tag values.

FIG. 22 illustrates an exemplary process of comparing tag values. Referring to FIG. 22, operations S220 to S225 are executed as a loop process such that those operations are repeated until an ending condition set in the operation S225 is satisfied. In an initialization process of the operation S220, i is set to "0". "i" represents the number of a comparison target buffer, the tag of which is compared with that of the reference buffer. Because there are two buffer units FIFO in FIG. 22, i is set to "0". If data is present in the buffer FIFOi (FIFO0) (YES in S221), the tag value TN of the data in the buffer FIFOi (FIFO0) is compared with the tag value TN of the data in the buffer FIFON (FIFO1) (S222). If the tag values TN are different from each other (i.e., mismatch) (YES in S223), i is incremented by one (S224). If the loop process ending condition i=N is satisfied (S225), the loop process comes to an end. Because N is now "1", the output module sets ON a tag flag (S226) without returning to the initial operation of the loop process. If the tag values TN are not different from each other (i.e., match) (NO in S223), the tag flag is turned OFF (S227).

Returning to the operation S213 in FIG. 21, if the tag flag is turned ON (YES in S214), the output module outputs the data in the low-priority buffer unit FIFO1 (S215). If the tag flag is not turned ON (NO in S214) and data is present in the high-priority buffer unit FIFO0 (YES in S216), the output module outputs the data (S217).

Further, if MODE=0 is not satisfied in the operation S211 (i.e., NO in S211), the output module is set to the passing (output) mode and stops outputting the low-priority buffer unit. If the high-priority data is present (YES in S216), the high-priority data is output (S217).

Figure 23:
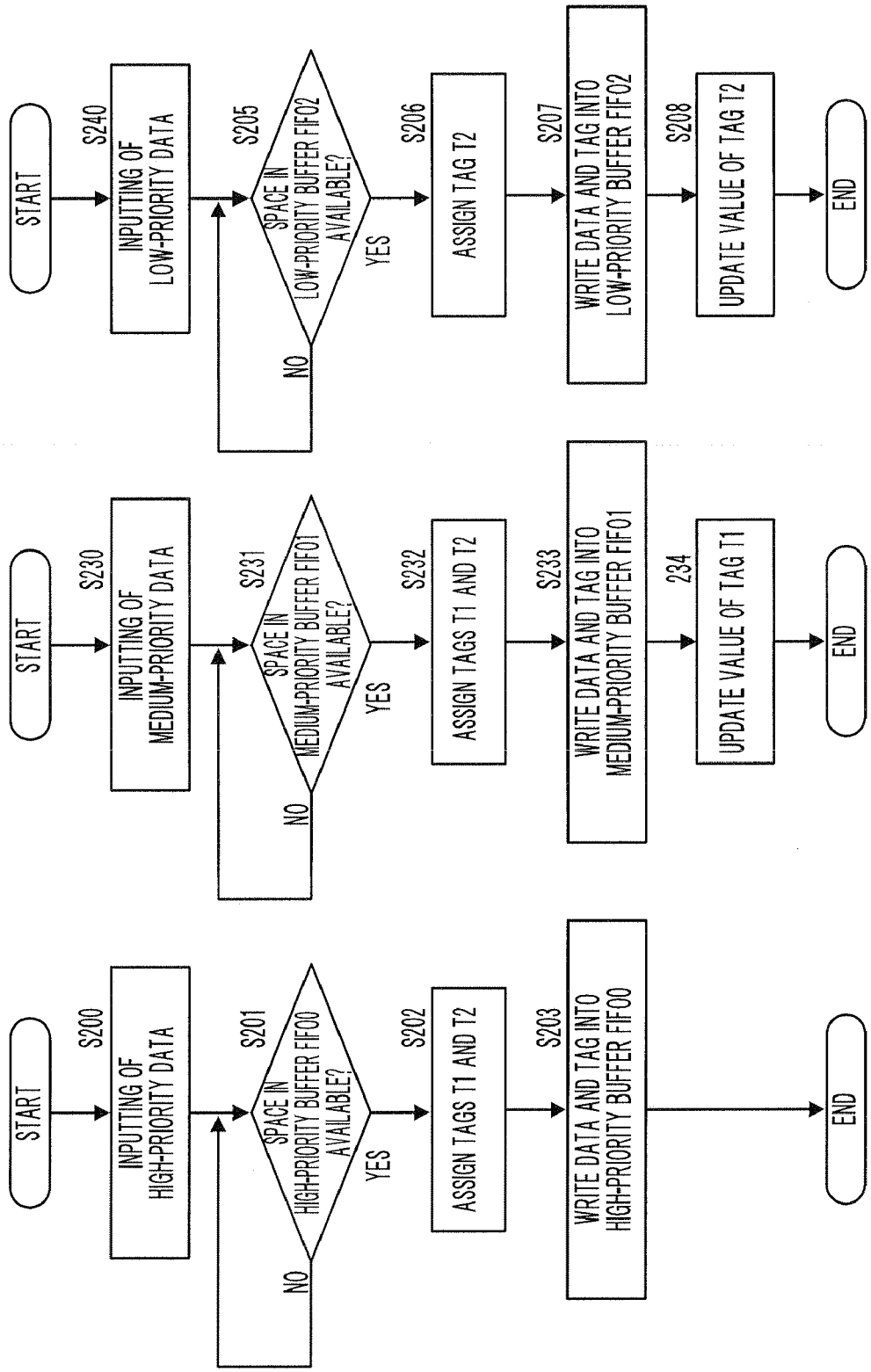
FIG. 23 illustrates an exemplary control of an input module.

FIG. 23 illustrates an exemplary control of an input module. The input module may be included in the data buffer device. The data buffer device illustrated in FIG. 23 includes three buffer units. In FIG. 23, high-priority data, medium-priority data, and low-priority data are input. A process (S200 to S203) for handling the high-priority data and a process (S204 to S208) for handling the low-priority data may be substantially the same as or similar to the corresponding processes illustrated in FIG. 20. A process (S230 to S234) for handling the medium-priority data is added. In the process for handling the low-priority data, the buffer unit may be FIFO2 and the tag value may be provided as T2. In the process for handling the high-priority data, the tag values may be provided as T1 and T2.

Upon inputting of the medium-priority data (S230), if there is an available space in the corresponding medium-priority buffer unit FIFO1 (YES in S231), the input module assigns the current tag values T1 and T2 to the input data (S232) and then writes the input data and the tag values T1 and T2 into the medium-priority buffer unit FIFO1 (S233). Thereafter, the input module updates the tag value T1.

When the low-priority data is input to the low-priority buffer unit FIFO2, the input module updates the tag value T2 (S208).

Figure 24:
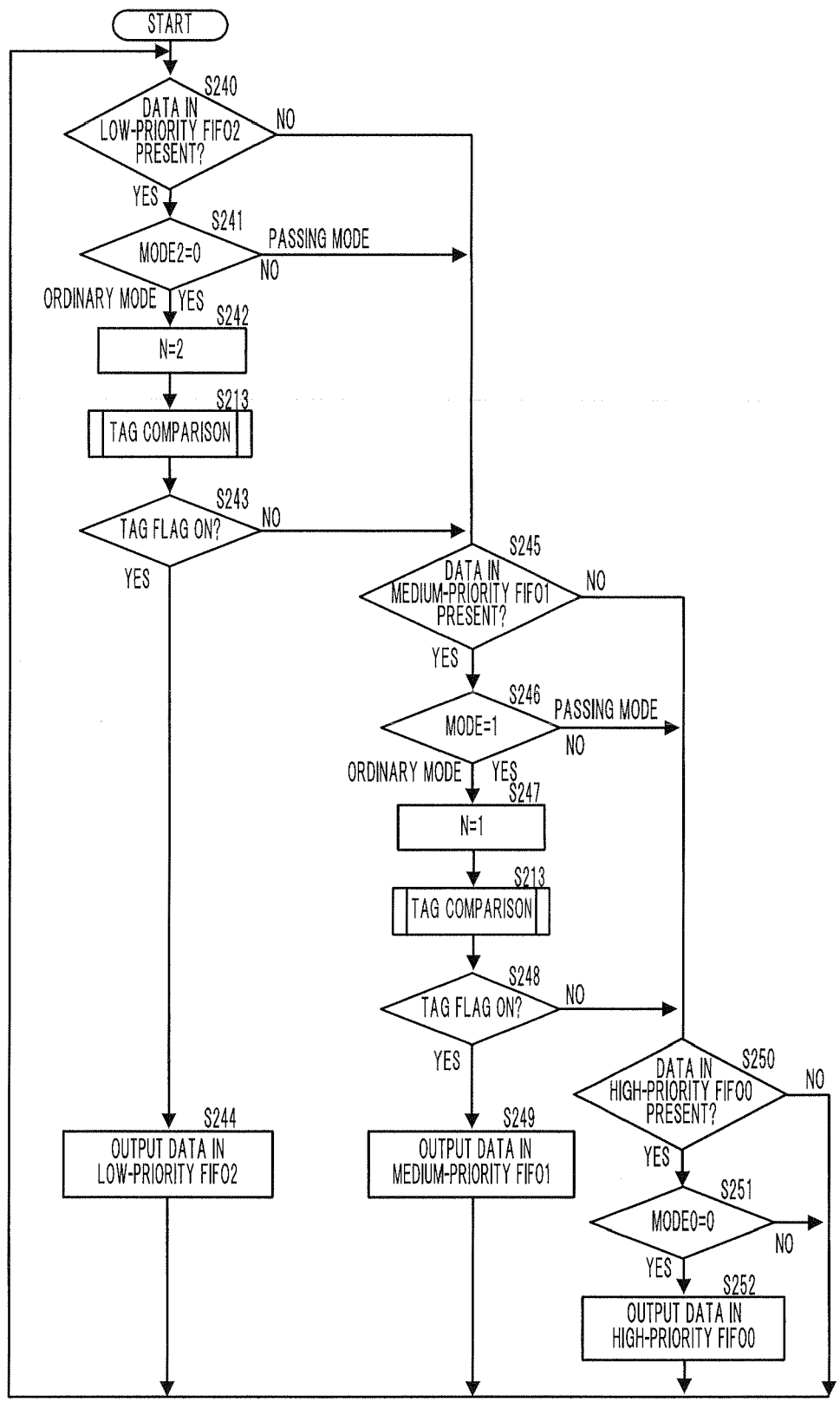
FIG. 24 illustrates an exemplary control of an output module.

FIG. 24 illustrates an exemplary control of an output module. The output module may be included in the data buffer device. The data buffer device illustrated in FIG. 24 includes three buffer units. The output module compares the tag value T2 of the data in the low-priority buffer unit FIFO2 with the tag values T2 of respective data in the high-priority buffer unit FIFO0 and the medium-priority buffer unit FIFO1, thereby determine whether the data in the low-priority buffer unit FIFO2 has been input earlier. If the data in the low-priority buffer unit FIFO2 has been input earlier, the data in the low-priority buffer unit FIFO1 is output. If the data in the low-priority buffer unit FIFO2 has not been input earlier, the output module compares the tag value T1 of the data in the medium-priority buffer unit FIFO1 with the tag value T1 of the data in the high-priority buffer unit FIFO0, thereby determine whether the data in the medium-priority buffer unit FIFO1 was input earlier. If the data in the medium-priority buffer unit FIFO1 was input earlier, the data in the medium-priority buffer unit FIFO1 is output. If the data in the medium-priority buffer unit FIFO1 was not input earlier, the data in the high-priority buffer unit FIFO0 is output.

In FIG. 24, if the low-priority data is present in the corresponding buffer (YES in S240), the output module sets the number of the buffer unit FIFO2, which serves as the reference buffer, as an argument N (e.g., N=2) (S242) and compares the tag values with each other (S213) in the ordinary (output) mode (YES in S241) that corresponds to the mode signal MODE2=0.

In the initializing operation S220 (see FIG. 22) of the loop process, i is set to "0". "i" represents the number of a comparison target buffer, a tag of which is compared with a tag of the reference buffer. If data is present in the buffer FIFOi (YES in S221), the tag value TN of the data in the buffer FIFOi is compared with the tag value TN (N=2) of the data in the reference buffer FIFON (N=2) (S222). If those tag values TN are different from each other (i.e., mismatch) (YES in S223), i is incremented by one (S224). The loop process (S222 to S225) is repeated until i=N is satisfied. The comparison of the tag values TN is repeated until the number of the comparison target buffer FIFOi with respect to the reference buffer reaches "N−1" from "0". If the tag values TN are all different from each other (i.e., mismatch), the tag flag is turned ON (S226).

If the tag values TN are not different from each other (i.e., match) (NO in S223), the tag flag is turned OFF (S227). When the tag flag is turned ON, the data in the reference buffer FIFOi has been input earlier. When the tag flag is turned OFF, the data in the reference buffer has not been input earlier.

Returning to FIG. 24, when the tag flag is turned ON in the operation S243, the output module outputs the data in the low-priority buffer unit FIFO2 (S244). When the tag flag is turned OFF in the operation S243, the number of FIFO1 serving as the reference buffer is set as the argument N (e.g., N=1) (S247) and the comparison of the tag values is executed (S213) if data is present in the medium-priority buffer unit FIFO1 (YES in S245) and the mode signal MODE1=0 is satisfied (YES in S246). A comparison process may be substantially the same as or similar to that illustrated in FIGS. 21 and 22. The output module compares the tag value T1 of the data in the buffer unit FIFO1 with the tag value T1 of the data in the buffer unit FIFO0.

When the tag flag is turned ON (YES in S248), the output module outputs the data in the medium-priority buffer unit FIFO1 (S249). When the tag flag is turned OFF (NO in S248), the output module outputs the data in the high-priority buffer unit FIFO0 if data is present in the high-priority buffer unit FIFO0 (YES in S250) and the mode signal MODE0=0 is satisfied (YES in S251). When the mode signal MODE0=1 is set (NO in S251), the data in the high-priority buffer unit FIFO0 is not output. Because data in the other buffer units FIFO1 and FIFO2 has not been input earlier than the data in the high-priority buffer unit FIFO0, no data is output.

If the mode signal is MODE2=1 or MODE1=1 in the operations S241 and S246, the data in the corresponding buffer unit FIFO2 or FIFO1 is not output.

If the tag values are generated when the high-priority buffer unit serves as the reference buffer, the low-priority buffer unit and the high-priority buffer unit may be exchanged in each of the previous flowcharts.

In the mode where data in certain selected buffer units are output, the unselected buffer unit stops outputting, and one of the certain buffer units is selected based on the comparison of the tag values between the certain selected buffer units.

FIG. 25 illustrates exemplary structures/classes. FIG. 25 illustrates an exemplary device. The device in FIG. 25 may be other than the data buffer device.

Referring to FIG. 25, in an operation S300, tag values are assigned to the structures or the classes when they are generated, and the structures or the classes are stored per priority together with the tag values. In FIG. 25, three structures/classes 300, 301 and 302 are stored per priority. In an operation S301, it is determined based on the comparison of the tag values which one of the structures or the classes has been input earlier. A process of comparing the tag values may be substantially the same as or similar to that in the previous illustration.

Input data are stored in FIFO buffer units based on attribute and an order which the data have been input. The input order of the data stored in the buffer units is detected by comparing the tag values with each other. After the data in a particular one of the buffer units have been output depending on the attribute, the data are output in the order which the data have been input based on the comparison of the tag values.

Example illustrations in accordance with aspects of the present invention have now been described in accordance with the above advantages. It will be appreciated that these examples are merely illustrative of the invention. Many variations and modifications will be apparent to those skilled in the art.

The invention claimed is:

1. A data buffer device that stores input data and outputs the stored data in a given sequence, comprising:
   a tag value generation circuit that generates a tag value for the input data;
   a first buffer that stores first priority data having a first priority in a first sequence, with which the first priority data is input, together with the tag values;
   a second buffer that stores second priority data having a second priority in a second sequence, with which the second priority data is input, together with the tag values; and
   a data output circuit that outputs one of the first priority data and the second priority data, which are positioned at respective heads of the first buffer and the second buffer,
   wherein the tag value generation circuit sets, in response to input of second preceding input data having the second priority, a tag value for the following second input data to a second tag value which differs from a first tag value for the second preceding input data, and sets, in response to input of first preceding input data having the first priority, a tag value of the following first input data to a fourth tag value that is substantially the same as a third tag value for the first preceding input data, and
   wherein the data output circuit outputs one of the first priority data and the second priority data, which is input earlier, in a first mode based on the tag values of the first priority data and the second priority data, and outputs the first priority data earlier than the second priority data in a second mode.

2. The data buffer device according to claim 1, wherein, in the first mode, the data output module outputs the first priority data when the tag values of the first priority data and the second priority data are substantially the same, and the second priority data when the tag values of the first priority data and the second priority data differ from each other.

3. The data buffer device according to claim 1, wherein each of the first buffer and the second buffer includes a buffer circuit having a number k of stages, and the tag value generation circuit successively generates (k+1) levels of tag values.

4. A data buffer device that stores input data and outputs the stored data in a given sequence, comprising:
   a tag value generation circuit that generates a tag value for the input data;
   first to n-th buffers that store first to n-th priority data having first to n-th priorities, respectively, in a sequence, with which the first to n-th priority data is input, together with the tag values; and
   a data output circuit that outputs one of the first to n-th priority data which is positioned at respective heads of the first to n-th buffers,
   wherein the tag value generation circuit generates a set of j-th tag values for each of j=2 to n, which correspond to the data input sequence between the j-th buffer and the first to (j−1)-th buffers, and
   the tag value generation module sets, in response to input of preceding input data to the j-th buffer, the tag value for the following input data to be different from a tag value for the preceding input data, and sets, in response to input of preceding input data to one of the first to (j−1)-th buffer, the tag value for the following input data to be substantially the same as a tag value for the preceding input data, and
   wherein the data output circuit outputs one of the first to n-th priority data, which is input earlier, based on the tag values for the first to n-th priority data in a first mode, and outputs the data in one of the first to n-th buffers in a second mode.

5. The data buffer device according to claim 4, wherein, in the first mode, the data output circuit compares the j-th tag values of respective head data between the j-th buffer and the first to (j−1)-th buffers in order from the n-th tag values to the second tag values, and outputs the data in the j-th buffer when the j-th tag values differ from each of the n-th tag values to the second tag values, and the data in the first buffer when the j-th tag values are substantially the same with one of the n-th tag values to the second tag values.

6. The data buffer device according to claim 5, wherein priority descends in order from the first priority to the n-th priority, and, when one of the first to n-th buffers stops outputting, the data output circuit first outputs the data in the buffer with a priority higher than the priority of the one of the first to n-th buffers.

7. The data buffer device according to claim 6, wherein when the data in the buffer with a priority lower than the one of the first to n-th buffers is input earlier than the data in the one of the first to n-th buffers, the data output circuit outputs the data in the buffer with the lower priority.

8. The data buffer device according to claim 4, wherein, upon return to the first mode from the second mode, the data output circuit outputs one of the first to n-th priority data, which is input earlier, based on the tag values of the first to n-th priority data at respective heads of the first to n-th buffers.

9. The data buffer device according to claim 4, wherein priority descends in order from the first priority to the n-th priority, and in the second mode, the data output circuit outputs earlier the data in the buffer with a higher priority than the data in the buffer with a lower priority.

10. The data buffer device according to claim 4, wherein each of the first to n-th buffers includes a buffer circuit having k stages, k being a positive integer, and the tag value generation circuit successively generates (k+1) levels of tag values for each of the n-th to second tag values.

11. The data buffer device according to claim 4, wherein n is 3.

12. The data buffer device according to claim 4, wherein higher-priority data is output earlier than lower-priority data in the second mode.

13. A data buffering method that stores input data and outputs the stored data in a given sequence, comprising:

generating a tag value for each of the input data;

storing first to n-th priority data having first to n-th priorities, respectively, in first to n-th buffers in a sequence, with which the first to n-th priority data are input, together with the tag values;

outputting one of the first to n-th priority data at respective heads of the first to n-th buffers;

generating a set of j-th tag values for each of j=2 to n, which correspond to the data input sequence between the j-th buffer and the first to (j−1)-th buffers;

setting a tag value for next input data, in response to input of preceding input data to the j-th buffer, to be different from a tag value for the preceding input data;

setting a tag value for the following input data, in response to input of preceding input data to one of the first to (j−1)-th buffer, to be substantially the same as a tag value for the preceding input data;

outputting one of the first to n-th priority data, which is input earlier, in a first mode based on the tag values of the first to n-th priority data at respective heads of the first to n-th buffers; and outputting the data in one of the first to n-th buffers in a second mode.

\* \* \* \* \*